(12) United States Patent
Viswanathan et al.

(10) Patent No.: US 12,353,481 B2
(45) Date of Patent: Jul. 8, 2025

(54) GENERATING PROBABILISTIC DATA STRUCTURES FOR LOOKUP TABLES IN COMPUTER MEMORY FOR MULTI-TOKEN SEARCHING

(71) Applicant: OneTrust LLC, Atlanta, GA (US)

(72) Inventors: Subramanian Viswanathan, San Ramon, CA (US); Anand Balasubramanian, Bangalore (IN); Milap Shah, Bangalore (IN); Tianchen Cai, Milpitas, CA (US)

(73) Assignee: OneTrust, LLC, Atlanta, GA (US)

( * ) Notice: Subject to any disclaimer, the term of this patent is extended or adjusted under 35 U.S.C. 154(b) by 0 days.

(21) Appl. No.: 18/450,080

(22) Filed: Aug. 15, 2023

(65) Prior Publication Data

US 2025/0061154 A1    Feb. 20, 2025

(51) Int. Cl.
*G06F 16/00* (2019.01)
*G06F 16/901* (2019.01)
*G06F 16/906* (2019.01)
*G06F 16/93* (2019.01)

(52) U.S. Cl.
CPC ........ *G06F 16/906* (2019.01); *G06F 16/9017* (2019.01); *G06F 16/93* (2019.01)

(58) Field of Classification Search
CPC ..... G06F 16/906; G06F 16/9017; G06F 16/93
See application file for complete search history.

(56) References Cited

U.S. PATENT DOCUMENTS

| | | | |
|---|---|---|---|
| 11,741,303 B2 * | 8/2023 | de Brébisson | G06F 40/166 715/256 |
| 2017/0357710 A1 * | 12/2017 | Shtossel | G06F 16/2455 |
| 2018/0113930 A1 * | 4/2018 | Frosst | G06F 16/93 |
| 2019/0129829 A1 * | 5/2019 | Chen | G06N 7/01 |
| 2021/0234816 A1 * | 7/2021 | Zong | G10L 15/22 |
| 2021/0256203 A1 * | 8/2021 | Das | G06N 3/08 |
| 2022/0210178 A1 * | 6/2022 | Pujar | G06F 8/51 |
| 2022/0309332 A1 * | 9/2022 | V V Ganeshan | G06F 40/30 |
| 2023/0153531 A1 * | 5/2023 | Geng | G06N 3/084 704/9 |

* cited by examiner

*Primary Examiner* — Alexander Khong
(74) *Attorney, Agent, or Firm* — Ballard Spahr LLP

(57) ABSTRACT

Methods, systems, and non-transitory computer readable storage media are disclosed for optimizing computer memory usage for lookup lists in computer memory via probabilistic data structures. For example, the disclosed system generates a probabilistic data structure (e.g., a Bloom filter) to represent data in a lookup list including multi-token items by hashing items of the lookup list to sets of bit values in a bit vector. The disclosed system classifies text content in a digital document by utilizing a maximum number of tokens from multi-token items in the lookup list to select and compare sets of sequential tokens in the digital document to the probabilistic data structure. The disclosed system also iteratively reduces the number of tokens in sets of sequential tokens for subsequent comparisons. Furthermore, in some aspects, the disclosed system causes a computing device to modify a digital document and/or database operations based on the classifications.

20 Claims, 15 Drawing Sheets

GENERATING PROBABILISTIC DATA STRUCTURES FOR LOOKUP TABLES IN COMPUTER MEMORY FOR MULTI-TOKEN SEARCHING

BACKGROUND

Advances in computer processing and data storage technologies have led to a significant increase in the amount and types of data moved to digital environments for processing and management. Specifically, many entities utilize computing devices to store, analyze, transmit, and/or perform a number of computing operations on different types of data in connection with various data processes. Computing systems handling (e.g., collecting, receiving, transmitting, storing, processing, sharing, and/or the like) certain types of digital data are often subject to various regulations or frameworks (e.g., internally for an entity or externally via one or more regulatory bodies), such as for security and privacy reasons associated with personally identifiable information (or "PII"). Additionally, downstream operations involving specific data types can also include various requirements for identifying, locating, scanning, or otherwise handling the specific data types.

Ensuring that entities are complying with various requirements associated with the different instances or types of data can involve analyzing large number of files to detect the specific instances or types of data. Due to different data requirements for various data processes and the large amounts of digital data that some computing systems handle, ensuring that various data types in the computing systems are accurately identified or labeled for use in downstream operations can be a challenging and time-sensitive task. Specifically, some systems that provide digital document analysis utilize lookup lists or tables to identify specific types of data in text content of digital documents. Although identifying instances of specific data types in digital documents can involve simple individual computing operations, performing many such computing operations can require a large amount of computing resources (e.g., computer memory and/or processing capabilities). Thus, performing direct comparisons of text content in high volumes of digital documents (e.g., terabytes of data) to large lookup lists (e.g., each including gigabytes of data) can result in a significant amount of required computing resources and/or processing time.

To detect specific data types in digital files via lookup lists, some conventional systems utilize classifiers that leverage tree structures that include words of lookup lists corresponding to different nodes. In particular, some conventional systems utilize a prefix tree (e.g., a "trie") that includes root nodes corresponding to individual tokens and various root-leaf node combinations representing multi-token (e.g., multi-word) items in a lookup list. The conventional systems classify an input by comparing each an individual token in a digital document to root nodes and iteratively comparing groups of tokens to the root-leaf node combinations.

Conventional systems that utilize tries to detect certain data types in digital documents suffer from several inefficiencies. Although such conventional systems can detect matches in a digital document relative to a lookup list with the longest possible sequence, tries for large lookup lists can take up a large amount of computer memory—in some instances more memory than the lookup lists themselves. Furthermore, comparing large volumes of documents to large lookup lists (e.g., via corresponding tries) can also require significant CPU resources. Given that many entities are often unable to dedicate significant resources to scanning data sources and analyzing digital documents for downstream operations—especially when such operations require regular or continuous analysis of large quantities of digital data—performing such downstream operations can be untenable for these entities.

Additionally, because certain types of data have higher time sensitivity than other data types, processing large amounts of data over large amounts of time (e.g., many days) can result in higher-priority data being exposed to security risks (e.g., data breaches or other unauthorized access). Furthermore, as computing systems, internal/external standards, and data change over time, re-processing large amounts of data to address the changes in a timely manner is often infeasible and can introduce additional technical challenges. Conventional systems thus typically leverage processes that fail to efficiently process data to detect various data types due to limited computing resources.

SUMMARY

This disclosure describes various aspects for optimizing computer memory usage for lookup lists in computer memory via probabilistic data structures. For example, the disclosed systems generate a probabilistic data structure (e.g., a Bloom filter) to represent/store data in a lookup list including multi-token items. Specifically, the disclosed systems generate the probabilistic data structure by hashing items of the lookup list to sets of bit values in a bit vector. Additionally, the disclosed systems utilize a classifier model to generate classifications for text content in a digital document by utilizing a maximum number of tokens from the lookup list to select and compare sets of sequential tokens in the digital document to the probabilistic data structure. The disclosed systems also iteratively reduce the number of tokens in sets of sequential tokens for subsequent comparisons to the sets of bit values in the probabilistic data structure. Furthermore, in some aspects, the disclosed systems provide indications of the classifications within a graphical user interface. In additional aspects, the disclosed systems also cause a computing device to modify a digital document and/or database operations based on classifications of text content relative to a lookup list. Thus, the disclosed systems provide a memory-efficient sliding window method of multi-token searches within a lookup list via the probabilistic data structure while limiting the number of searches involving each token in the digital document.

BRIEF DESCRIPTION OF THE DRAWINGS

Various aspects will be described and explained with additional specificity and detail through the use of the accompanying drawings.

DETAILED DESCRIPTION

Figure 1:
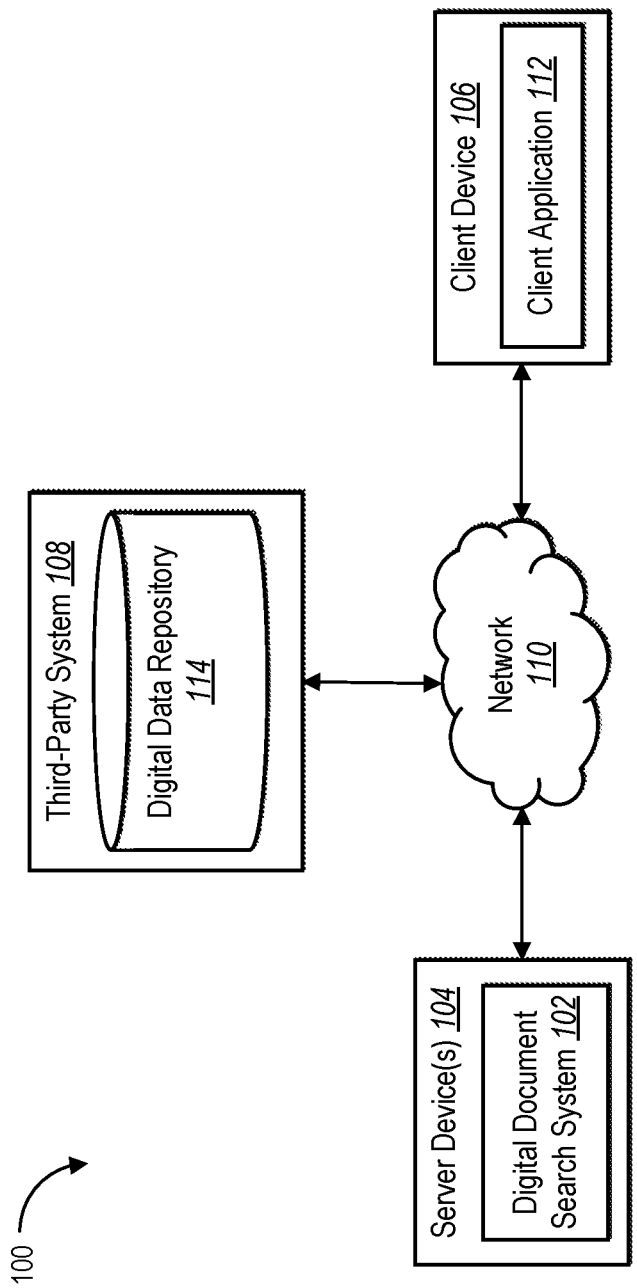
FIG. 1 illustrates an example of a system environment in which a digital document search system can operate in accordance with one or more aspects.

This disclosure describes one or more aspects of a digital document search system that utilizes a probabilistic data structure to represent a lookup list for processing text content in digital documents in accordance with various downstream operations. For example, the digital document search system generates a probabilistic data structure (e.g., a Bloom filter) representing data in a lookup list. The digital document search system utilizes a maximum number of tokens of multi-token items in the lookup list to select sets of sequential tokens for comparing to the bit values in the probabilistic data structure. Additionally, the digital document search system iteratively reduces the number of tokens in each set of sequential tokens for subsequent comparisons to the probabilistic data structure. In various aspects, the digital document search system generates and provides notifications of text content found from the digital documents in the lookup list for display within a graphical user interface and/or for modifying the digital documents or database operations that impact the digital documents.

As mentioned, in one or more aspects, the digital document search system generates a probabilistic data structure to represent data in a lookup list. For example, the digital document search system generates the probabilistic data structure (e.g., the Bloom filter) by hashing items in a lookup list related to one or more sets of digital data requirements or data processes to sets of bit values in a bit vector. Thus, the digital document search system maps the lookup list to a data structure that takes up a smaller amount of computer memory space in connection with identifying, labeling, or otherwise processing digital documents in connection with downstream operations.

In one or more aspects, the digital document search system generates classifications for text content in digital documents utilizing a sliding window with variable token length within the digital documents for comparing to the probabilistic data structure. In particular, the digital document search system identifies a maximum possible length of items in the lookup list to use in selecting sets of sequential tokens from a digital document to find in the lookup list. The digital document search system selects an initial set of sequential tokens including a number of tokens corresponding to the maximum possible length of items. The digital document search system compares the initial set to the bit values stored in the probabilistic data structure, reduces the number of tokens in the initial set to determine a new set, and compares the new set to the bit values stored in the probabilistic data structure. Accordingly, the digital document search system iteratively compares and reduces the number of tokens in a set of sequential tokens to find in the probabilistic data structure.

In various aspects, the digital document search system provides interactive indications of classifications of text content in digital documents relative to a lookup list corresponding to a set of digital data requirements or a data process. Specifically, the digital document search system can provide indications of digital documents that include specific data types (e.g., PII) for use in various data processes (e.g., downstream operations involving the data types). Additionally, the digital document search system can provide options to modify one or more digital documents or database operations to correct any issues associated with the classifications of the digital documents relative to the data processes. To illustrate, the digital document search system can cause one or more computing devices (e.g., via integrations of software applications with computing hardware) to implement the modifications to the digital documents/database operations in response to interactions with the indications of the classifications.

Some aspects involve including a digital document search system as a component of a computing environment that includes software and/or hardware for implementing data processing in connection with communication, physical, and/or information security. In these aspects, the operation of an environment including such software and/or hardware can be improved via inclusion of the digital document search system and operation of various data processes/rules applied by the digital document search system or other system (e.g., a compliance management system), as described herein. In one example, an environment can include the digital document search system as well as computing systems that analyze digital communication patterns for various purposes by leveraging data processes to extract and analyze digital data from a number of different computing systems (e.g., in distributed architectures or local network systems). The digital document search system provides tools for implementing, executing, and managing the results of data processes according to various digital data requirements associated with digital communications (e.g., including controls requiring specific encryption types or other methods of handling such data). By providing tools to manage the implementation and execution of various data processes to detect, modify, or redact specific data types in various digital files, the digital document search system can leverage the disclosed probabilistic data structures to ensure the accuracy, security, sensitivity, and reliability of the computing systems and data in connection with the data processes.

In one or more aspects, the digital document search system improves upon shortcomings of conventional systems in relation to managing computing systems that implement data search processes. In contrast to conventional systems that utilize direct lookup list searches or trie data structures to perform digital document searches, the digital document search system provides improved memory usage via probabilistic data searches to represent lookup lists. In particular, by generating hashing lookup lists to probabilistic data structures and restricting searches utilizing a maximum number of sequential tokens for items in the lookup lists, the digital document search system provides accurate and efficient multi-token searching of digital documents. Furthermore, the digital document search system can lower false positive rates by increasing bit vector sizes in the probabilistic data structures while maintaining improved memory usage over conventional systems.

The digital document search system also provides advantages over conventional systems by providing tools to efficiently and accurately determine compliance of computing systems with various data processes. For example, in some aspects, the digital document search system provides tools for efficiently processing digital documents to detect specific data types involved in the data processes (e.g., as described above). Additionally, the digital document search system provides tools for implementing controls associated with various security, privacy, legal, or ethical standards in response to detecting certain data types (e.g., PII) in the digital documents. To illustrate, the digital document search system provides tools to automatically modify digital documents with detected data types (e.g., via redaction or encryption) and/or to automatically modify database operations that cause non-compliance with detected data types. More specifically, the digital document search system can leverage integrations with hardware and software to cause computing devices to modify digital documents or data processes with access to the digital documents to correct compliance gaps or configuration gaps associated with the detected data types.

Turning now to the figures, FIG. 1 includes an aspect of a system environment 100 in which a digital document search system 102 is implemented. In particular, the system environment 100 includes server device(s) 104, a client device 106, and a third-party system 108 in communication via a network 110. Moreover, as shown, the client device 106 includes a client application 112, and the third-party system 108 includes a digital data repository 114.

As shown in FIG. 1, in one or more aspects, the server device(s) 104 include or host the digital document search system 102. Specifically, the digital document search system 102 includes, or is part of, one or more systems that process digital data from the digital data repository 114 and/or one or more other repositories of the third-party system 108. For example, the digital document search system 102 provides tools to the client device 106 for managing data associated with an entity or for performing various data processes for the entity. In one or more aspects, the digital document search system 102 provides tools to the client device 106 via the client application 112 for viewing and managing information associated with data that the entity handles, including data stored at the digital data repository. In one or more aspects, the digital document search system 102 installs or communicates with software at the client device 106 (e.g., via the client application 112) and/or at the third-party system to extract data and perform one or more data processes on the data in connection with managing controls related to one or more security or privacy standards.

To illustrate, with the digital document search system 102 can perform scanning and classification operations involving searching digital documents in connection with one or more downstream operations and/or a set of digital data requirements, which can include internal or external requirements for handling specific types of data. For example, the digital document search system 102 can scan and classify data for downstream operations to ensure compliance with a set of regulations including, for example, a set of requirements for handling specific types of data in connection with practices established by the International Organization for Standardization ("ISO"), internally by a particular organization (e.g., a multinational corporation), or a territory government (e.g., the European Union). Furthermore, because data processes that handle specific types of data within a computing environment can have different levels of importance, certain data types can have higher time sensitivity than other data types. In additional aspects, scanning and classifying data for data processes can involve one or more lookup lists that correspond to specific data types handled by the data processes.

In one or more aspects, the digital document search system 102 manages database, contents of databases, computing devices, or other components of an environment in which an entity handles specific data types via the use of data objects. As used herein, the term "data object" refers to a digital object for tracking or managing systems, software, data sources, entities, or other functions or infrastructure involved in handling specified data for an entity. For example, a data object can include a digital representation of the entity itself, a sub-entity such as subsidiary of the entity, a business unit of the entity, a data asset, a project, a dataset, digital documents in a dataset, or a computing operation such as a data process. Additionally, in some aspects, the digital document search system 102 utilizes different types of data objects to represent different types of components, such as a dataset object to represent a dataset, a document object to represent a digital document, a filter object representing a probabilistic data structure, etc. In additional aspects, data objects include, but are not limited to, control objects representing software/hardware controls for handling data, evidence objects representing evidence tasks for collecting evidence of implemented controls, or data assets (e.g., computing components) on which data processes operate.

In one or more additional aspects, the digital document search system 102 generates/stores a data object representing a data asset including a computing component such as, but not limited to, a computing system, a software application, a website, a mobile application, or a data storage/repository. To illustrate, a data object for a data asset can represent a digital data repository (e.g., the digital data repository 114) in the form of a database used for storing specified data. Additionally, a data object for a data asset can represent the third-party system 108, or other systems. The digital document search system 102 thus generates and stores a plurality of data objects (e.g., at the digital data repository 114 or at a different digital data repository at the server device(s) 104) representing different aspects of computing operations associated with the data processes.

Additionally, as used herein, the term "data process" refers to a computing process that performs one or more actions associated with specified data. In some aspects, a data process is represented by a data object (i.e., a "data process object"). For example, the digital document search system 102 generates/stores a data object representing a data process including, but not limited to, a computing process or action corresponding to execution of processing instructions (e.g., by utilizing a database operation) to process, collect, access, store, retrieve, modify, or delete target data. To illustrate, for target data including credit card information and payment information associated with processing a credit card transaction, the digital document search system 102 generates a data object to represent a data process that collects the credit card information through a form (e.g., webpage) provided via the website and processes the credit card information with the appropriate card provider to process the credit card transaction.

In one or more aspects, the digital document search system 102 also provides tools for using the data objects to manage functions or infrastructure associated with one or more data processes. To illustrate, certain types of data are subject to certain requirements/controls in how the data is handled (e.g., processed, transmitted, stored). Accordingly, the digital document search system 102 analyzes the data objects (e.g., via one or more data analysis projects) to determine whether the functions or infrastructure represented by the data objects are in compliance with a set of digital data requirements that indicates the specific requirements/controls in connection with one or more data processes. For instance, the digital document search system 102 can utilize the data objects to process digital documents for determining whether the digital documents include certain data types (e.g., using a probabilistic data structure corresponding to a lookup list). In one or more aspects, a data process includes a set of computer-based requirements for handling data or otherwise configuring an entity's functions or infrastructure for performing one or more downstream operations involving the data.

According to one or more aspects, the digital document search system 102 manages data objects by communicating with the digital data repository 114 and/or the third-party system 108. Specifically, the digital document search system 102 can communicate with the digital data repository 114 and/or the third-party system 108 to generate data objects representing data and/or to determine or otherwise obtain information associated with the data objects for managing digital documents in the digital data repository 114. In some aspects, one or more of the client device 106 control or use the third-party system 108 and/or the digital data repository 114 for the entity. The digital document search system 102 may be configured to communicate with the digital data repository 114 and/or the third-party system 108 on behalf of the entity via an integration that is installed on the digital document search system 102 that is configured with the entity's credentials (e.g., via an integrated data extraction software application). The digital document search system 102 can obtain metadata or other information about the infrastructure or functions used by the entity and thereby populate attributes of the data objects with this information.

In additional aspects, the digital document search system 102 communicates with the client device 106 to obtain information associated with the data objects or to provide information about the data objects for display within the client application 112. For instance, the digital document search system 102 can obtain, via user input received from an administrator client device, metadata or other information about the infrastructure or functions used by the entity and thereby populate attributes of the data objects with this information.

In one or more aspects, the third-party system 108 include server devices, individual client devices, or other computing devices associated with an entity. For instance, a third-party computing system includes one or more computing devices for performing a data process involving handling data associated with one or more operations of the entity for one or more data processes. To illustrate, the third-party computing system includes one or more server devices that generate, process, store, or transmit payment card processing data subject to PCI DSS in one or more jurisdictions and are therefore covered by one or more corresponding security, privacy, or legal requirements.

In one or more aspects, the server device(s) 104 include a variety of computing devices, including those described below with reference to FIG. 15. For example, the server device(s) 104 includes one or more servers for storing and processing data associated with one or more data processes. In some aspects, the server device(s) 104 also include a plurality of computing devices in communication with each other, such as in a distributed storage environment. In some aspects, the server device(s) 104 include a content server. The server device(s) 104 also optionally includes an application server, a communication server, a web-hosting server, a social networking server, a digital content campaign server, or a digital communication management server.

In one or more aspects, the client device 106 includes, but is not limited to, a desktop, a mobile device (e.g., smartphone or tablet), or a laptop including those explained below with reference to FIG. 15. Furthermore, although not shown in FIG. 1, the client device 106 can be operated by users (e.g., a user included in, or associated with, the system environment 100) to perform a variety of functions. In particular, the client device 106 performs functions such as, but not limited to, accessing, viewing, and interacting with data associated with data processes. In some aspects, the client device 106 also performs functions for generating, capturing, or accessing data to provide to the digital document search system 102 in connection with controls for the data processes. For example, the client device 106 communicates with the server device(s) 104 via the network 110 to provide information (e.g., user interactions) associated with data objects. Although FIG. 1 illustrates the system environment 100 with a single client device, in some aspects, the system environment 100 includes a plurality of client devices. In some aspects, the client device 106 or another system hosts the digital data repository 114.

Additionally, as shown in FIG. 1, the system environment 100 includes the network 110. The network 110 enables communication between components of the system environment 100. In one or more aspects, the network 110 may include the Internet or World Wide Web. Additionally, the network 110 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104, the client device 106, the digital data repository 114, and the third-party system communicate via the network using one or more communication platforms and technologies suitable for transporting data and/or communication signals, including any known communication technologies, devices, media, and protocols supportive of data communications, examples of which are described with reference to FIG. 15.

Although FIG. 1 illustrates the server device(s) 104, the client device 106, the digital data repository 114, and the third-party system communicating via the network 110, in alternative aspects, the various components of the system environment 100 communicate and/or interact via other methods (e.g., the server device(s) 104, the client device 106, the digital data repository 114, and/or the third-party system can communicate directly). Furthermore, although FIG. 1 illustrates the digital document search system 102 and the digital data repository 114 being implemented separately within the system environment 100, the digital document search system 102 and the digital data repository 114 can alternatively be implemented, in whole or in part, by a particular component and/or device within the system environment 100 (e.g., the server device(s) 104). Additionally, in some aspects, the third-party system includes the client device 106.

In some aspects, the server device(s) 104 support the digital document search system 102 on the client device 106. For instance, the server device(s) 104 generates/maintains the digital document search system 102 and/or one or more components of the digital document search system 102 for the client device 106. The server device(s) 104 provides the digital document search system 102 to the client device 106 (e.g., as part of a software application/suite). In other words, the client device 106 obtains (e.g., downloads) the digital document search system 102 from the server device(s) 104. At this point, the client device 106 is able to utilize the digital document search system 102 to scan and classify data in digital documents independently from the server device(s) 104.

In alternative aspects, the digital document search system 102 includes a web hosting application that allows the client device 106 to interact with content and services hosted on the server device(s) 104. To illustrate, in one or more aspects, the client device 106 accesses a web page supported by the server device(s) 104. The client device 106 provides input to the server device(s) 104 to perform digital document analysis, and, in response, the digital document search system 102 on the server device(s) 104 performs operations to view/manage data associated with data processes. The server device(s) 104 provide the output or results of the operations to the client device 106.

Figure 2:
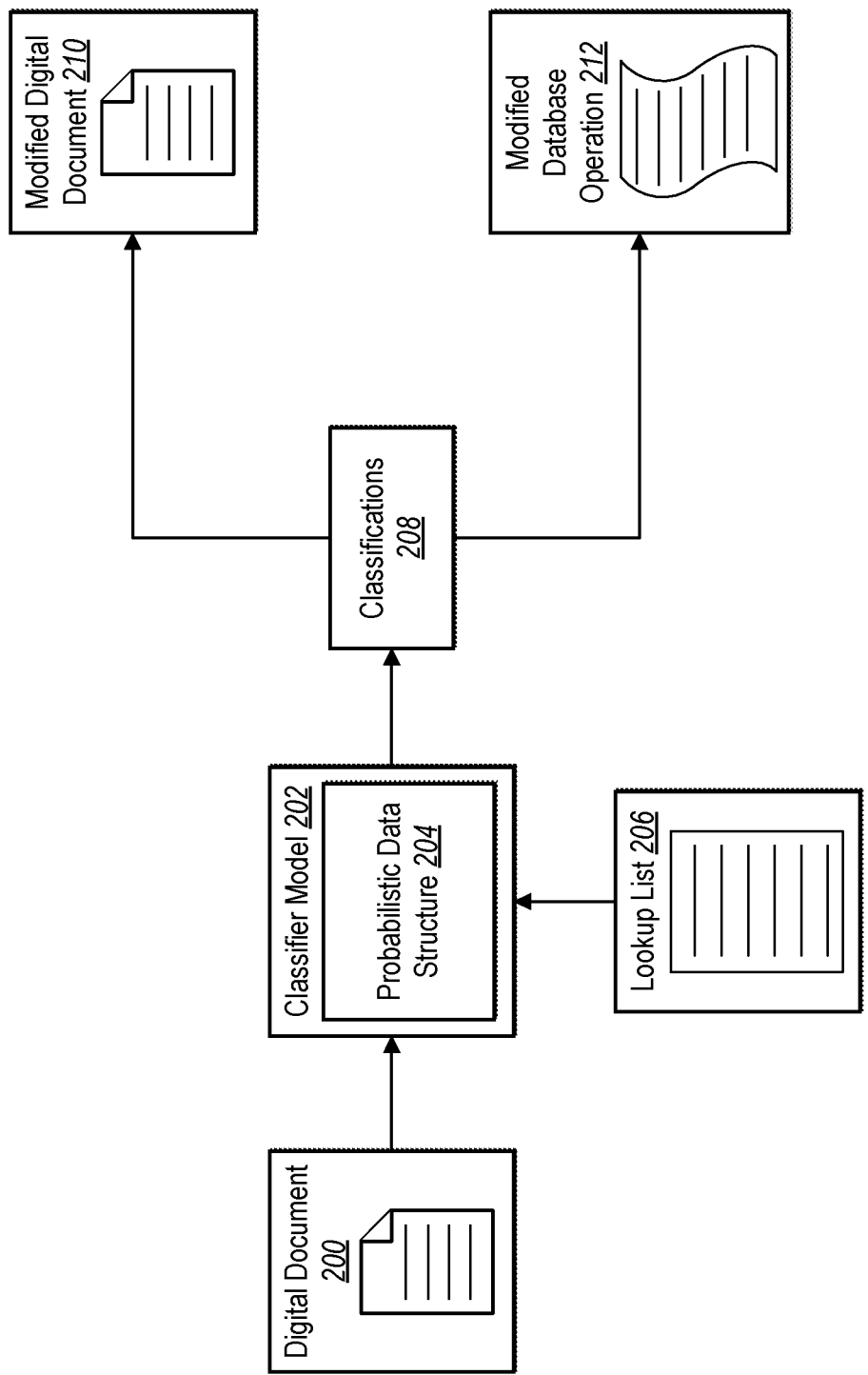
FIG. 2 illustrates an example of an overview of the digital document search system generating classifications for text content in a digital document based on a lookup list via a probabilistic data structure in accordance with one or more aspects.

As mentioned, the digital document search system 102 provides classifications of text content in digital documents by utilizing a probabilistic data structure representing a lookup list. FIG. 2 illustrates an example of an implementation of a classifier model including a probabilistic data structure generated for a lookup list. As illustrated in FIG. 2, the digital document search system 102 generates classifications for contents of a digital document by determining whether the contents are found in the lookup list via the probabilistic data structure. FIG. 2 also illustrates that the digital document search system 102 can take various actions based on the classifications of the contents of the digital document.

In one or more aspects, as illustrated in FIG. 2, the digital document search system 102 determines a digital document 200 for processing via a classifier model 202. For example, the digital document 200 includes a text document or other document type that includes at least some text content. To illustrate, the digital document 200 includes a digital representation of a form with fillable form fields that include personally identifiable information, financial information, or other information that is associated with one or more security or privacy standards (and data requirements corresponding to handling such information). In additional aspects, the digital document search system 102 determines digital documents that include text content in articles, letters, or other unstructured text content for analysis. In one or more aspects, an entity is associated with a plurality of digital documents of different types (e.g., including text content in various formats) that the digital document search system 102 processes via the classifier model 202.

According to one or more aspects, the digital document search system 102 utilizes the classifier model 202 to classify text in the digital document 200 relative to a probabilistic data structure 204 representing a lookup list 206. In particular, as mentioned, the digital document search system 102 can utilize the lookup list 206 to determine whether the digital document 200 includes one or more specific data types. As referred to herein, the term "lookup list" refers to a computer file including a number of unique tokens or values for detection in digital content. To illustrate, the lookup list 206 includes a number of words, phrases, acronyms, combinations of characters, or other n-grams that indicate one or more specific data types. For example, as previously mentioned, the digital document search system 102 may utilize the lookup list 206 in connection with determining whether the digital document 200 conforms/complies with one or more security or privacy standards. According to one or more examples, the lookup list 206 includes a large list of names or other tokens indicating personally identifiable information, medical terms, financial terms, etc.

In one or more aspects, the digital document search system 102 generates the probabilistic data structure 204 to represent the lookup list 206. Specifically, as described in more detail with respect to FIGS. 3 and 4, the digital document search system 102 generates the probabilistic data structure 204 to include sets of bit values representing individual items in the lookup list 206. More specifically, the probabilistic data structure 204 includes bit values in a bit vector to which the items in the lookup list 206 are hashed to provide memory efficient representations of the items in the lookup list 206.

In connection with generating the probabilistic data structure 204 for the lookup list 206, the digital document search system 102 utilizes the classifier model 202 to generate classifications 208 for text content in the digital document 200. For example, the digital document search system 102 generates the classifications 208 for portions of text content in the digital document 200 utilizing the classifier model 202. Accordingly, as described in more detail below with respect to FIG. 5, the digital document search system 102 leverages the probabilistic data structure 204 representing the lookup list 206 to classify words, groups of words, phrases, or other n-grams in the digital document 200 based on whether they are contained in the lookup list 206.

In additional aspects, the digital document search system 102 utilizes the classifications 208 of the text content in the digital document 200 to perform one or more additional operations. Specifically, as illustrate in FIG. 2, the digital document search system 102 can utilize the classifications 208 to generate a modified digital document 210. For example, the digital document search system 102 modifies text content in the digital document 200 in response to detecting specific classifications corresponding to one or more data types. Furthermore, as illustrated in FIG. 2, the digital document search system 102 can utilize the classifications to generate a modified database operation 212 that manages, accesses, or modifies digital documents including the digital document 200. To illustrate, the digital document search system 102 modifies a script or application in a data process associated with the digital document 200 to modify the digital document 200 or additional digital documents associated with the digital document 200.

In one or more aspects, as mentioned, the digital document search system 102 processes digital documents to determine compliance with various digital data requirements of one or more security or privacy standards. For example, the digital document search system 102 analyzes digital documents to determine whether the content of the digital documents complies with the digital data requirements. To illustrate, the digital document search system 102 determines whether a specific set of digital documents associated with an entity includes personally identifiable information or other data types for which certain requirements exist for handling the data types.

Figure 3:
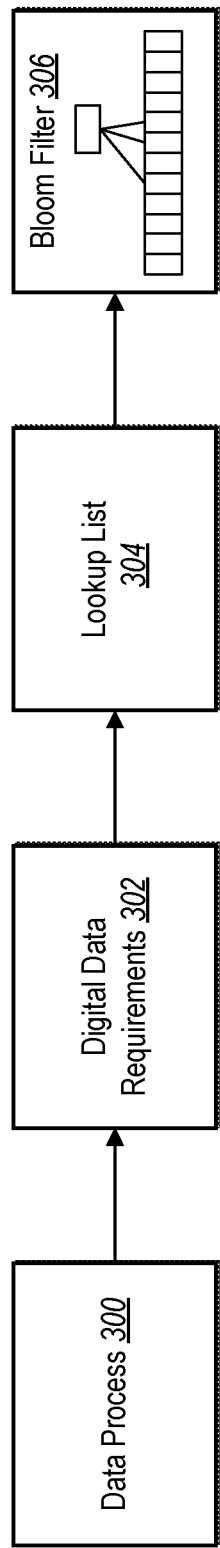
FIG. 3 illustrates an example of the digital document search system hashing a lookup list corresponding to a data process to a Bloom filter in accordance with one or more aspects.

FIG. 3 illustrates an aspect in which the digital document search system 102 utilizes a set of standards or data processes to determine relevant data types for detecting in digital documents. In particular, as shown, the digital document search system 102 determines a data process 300 that handles one or more specific data types. In some instances, the data process 300 is associated with one or more regulations that indicate requirements for how one or more specific data types are handled. For instance, as mentioned, the data process 300 includes (or is associated with) digital data requirements 302 that indicate one or more specific methods of storage, transmission, redaction, encryption, bundling, or other computing operations in connection with one or more data processes that handle the indicated data types. The data process 300 may include (or be associated with) the digital data requirements 302 for a single data type or for a plurality of data types and/or for data types in connection with specific digital documents (e.g., specific file types/extensions). Additionally, in some aspects, a single data type is associated with more than one data processes and/or more than one set of digital data requirements.

In one or more examples of the digital data requirements 302, the data process 300 includes software and/or hardware subject to various requirements for processing and storing personally identifiable information in specific industries (e.g., medical providers or social media networks). To illustrate, the digital data requirements 302 include requirements that files stored in connection with user account data be encrypted when stored at computing devices of a service provider (e.g., the third-party system 108 of FIG. 1). Additionally, the digital data requirements 302 may include requirements that certain types of data be redacted prior to storage at computing devices of a service provider. Further examples of the digital data requirements 302 include, but are not limited to, time limits for storing specific data types, limitations on who (e.g., which user accounts or third-party systems) have access to the data types, or which data types can be transmitted in connection with specific data processes or transactions.

In one or more aspects, the digital document search system 102 determines a lookup list 304 in connection with the data process 300 and digital data requirements 302. Specifically, the lookup list 304 includes a plurality of tokens (e.g., n-grams) that indicate specific data types associated with the digital data requirements 302. For instance, the items in the lookup list 304 can include words, phrases, or character combinations that indicate (or frequently correlate with) the indicated data types covered by the digital data requirements 302. Accordingly, the digital document search system 102 can generate the lookup list 304 or access the lookup list 304 from another computing system in connection with managing configuration of a computing system in connection with the data process 300.

FIG. 3 illustrates that the digital document search system 102 generates a probabilistic data structure representing the lookup list 304. In particular, FIG. 3 illustrates that the probabilistic data structure includes a Bloom filter 306. More specifically, the Bloom filter 306 includes a bit vector to which items (e.g., separate entries) in the lookup list are mapped/hashed. To illustrate, as described in more detail with respect to FIG. 4, the digital document search system 102 hashes items in the lookup list 304 to sets of bit values in the bit vector of the Bloom filter 306. Although FIG. 3 illustrates that the digital document search system 102 utilizes a Bloom filter 306 to represent the lookup list 304, in alternative aspects, the digital document search system 102 utilizes a different probabilistic data structure such as an Xor filter or a Ribbon filter.

Figure 4:
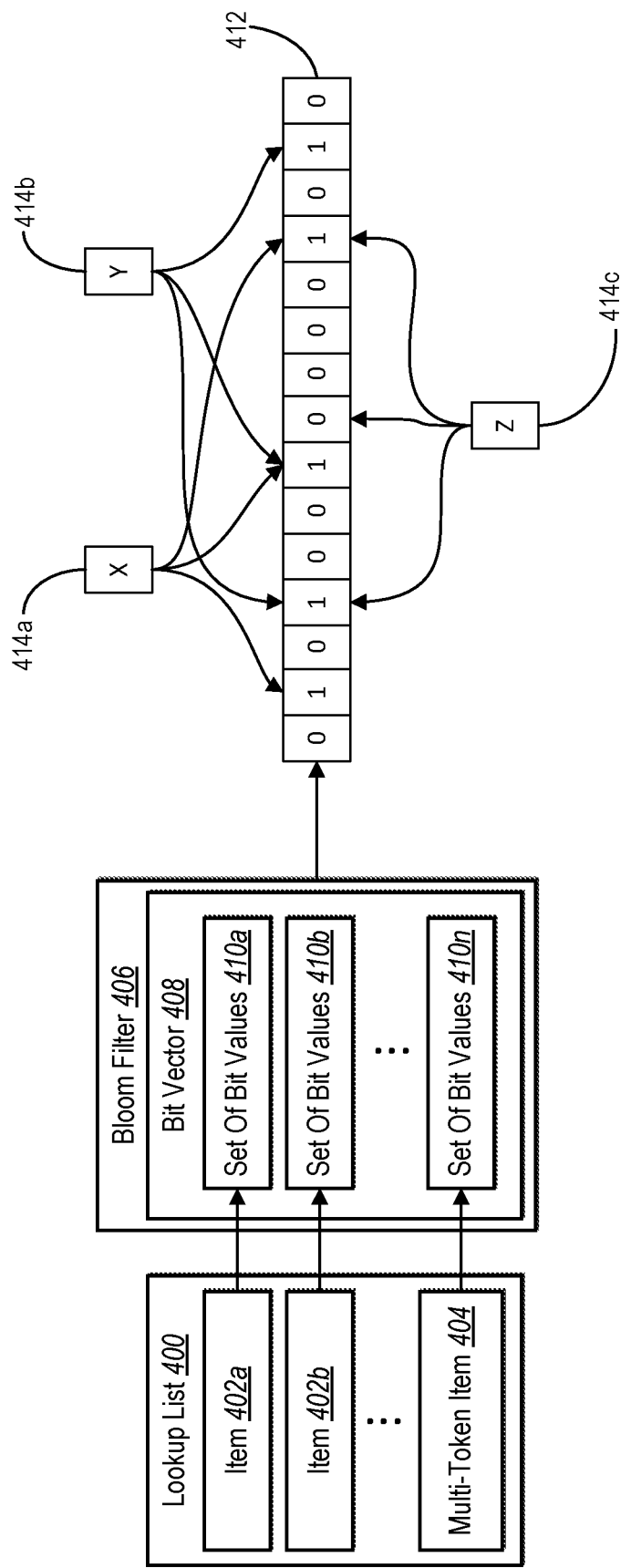
FIG. 4 illustrates an example of the digital document search system generating a Bloom filter items in a lookup list in accordance with one or more aspects.

FIG. 4 illustrates an example of the digital document search system 102 mapping items in a lookup list to a probabilistic data structure. Specifically, FIG. 4 illustrates that a lookup list 400 includes a plurality of items comprising words or n-grams corresponding to one or more data types. For example, the lookup list 400 includes a large list of items (e.g., tokens or token combinations) indicating first names, last names, middle names, and/or full names. Accordingly, the lookup list 400 can include items such as "John," "John Doe," and "Doe," in addition to many other names. In alternative examples, the lookup list 304 includes items medical terminology, acronyms, or other words, phrases, or other n-grams that are indicative of a particular data type.

As illustrated, the lookup list 400 includes a first item 402a and a second item 402b, each including a single token. To illustrate, a single-token item can include a single word or combination of characters without spaces (or other delimiter). For instance, the first item 402a includes "John" and the second item 402b includes "Doe". Furthermore, the lookup list 400 can include multi-token items (e.g., multi-token item 404) for which a combination of words separate by a space combines to make up a single item in the lookup list 400. To illustrate, the multi-token item 404 includes "John Doe", which is a combination of the first item 402a and the second item 402b but is treated as a separate entry in the lookup list 400.

Additionally, FIG. 4 illustrates that the digital document search system 102 generates a Bloom filter 406 to represent the items in the lookup list 400 by hashing the items into a bit vector 408. Specifically, the digital document search system 102 hashes the first item 402a into the bit vector 408 by mapping the first item 402a to a first set of bit values 410a. The digital document search system 102 hashes the second item 402b into the bit vector 408 by mapping the second item 402b to a second set of bit values 410b. Additionally, the digital document search system 102 hashes the multi-token item 404 into the bit vector 408 by mapping the multi-token item 404 to a nth set of bit values 410n. Thus, generating the Bloom filter 406 involves the digital document search system 102 mapping each of the separate items in the lookup list 400 to a set of bit values.

FIG. 4 further illustrates an example of a bit vector 412 to which a plurality of items in a lookup list are hashed. In particular, as illustrated, the digital document search system 102 hashes a first item 414a ("X") to a first set of bit values in the bit vector 412. To hash the first item 414a to the first set of bit values, the digital document search system 102 can select a plurality of bit locations in the bit vector 412 (e.g., via random, semi-random, or predetermined selection of bits) and set the selected bit locations to a specific value (e.g., "1"). Additionally, the digital document search system 102 selects a plurality of bit locations for the second item 414b and sets the selected bit locations to the specific value. As illustrated, at least one bit location overlaps between the bit locations corresponding to the first item 414a and the second item 414b.

In one or more aspects, the bit vector 412 with sets of bit values mapped to the items in the lookup list provides probabilistic search over the toggled bits for determining whether specific tokens or sets of tokens are found in the lookup list. To illustrate, the digital document search system 102 determines whether a third item 414c is located in the lookup list by determining a hash for the third item 414c relative to bit locations in the bit vector 412 and determining whether the corresponding bits are toggled on (e.g., whether the bit locations have the specific value). In response to determining that one or more of the bits associated with the hash of the third item 414c are not toggled on (e.g., do not have the specific value), the digital document search system 102 determines that the lookup list does not have the third item 414c. Alternatively, in response to determining that all bit values for the hash of the third item 414c are toggled on, the digital document search system 102 determines, according to a specific probability value based on the bit vector size, that the third item 414c is likely in the lookup list. In some aspects, the digital document search system 102 reduces the probability of false positives by increasing the bit vector size at the cost of using more memory while still using less memory than conventional systems.

Figure 5:
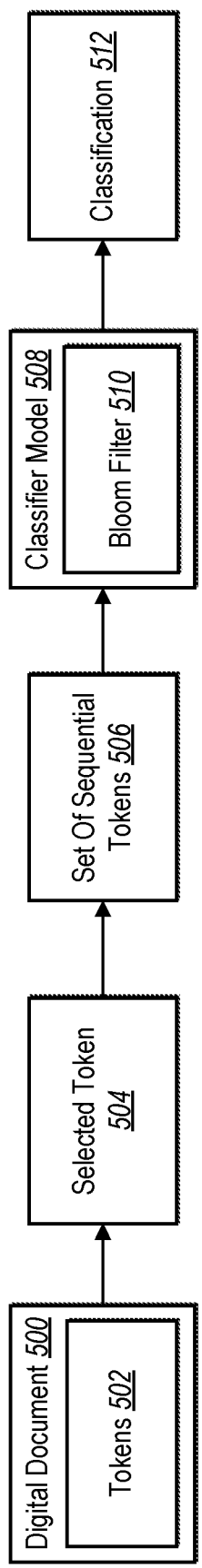
FIG. 5 illustrates an example of the digital document search system generating a classification for a set of sequential tokens in a digital document in accordance with one or more aspects.

FIG. 5 illustrates that the digital document search system 102 utilizes a probabilistic data structure to determine whether a digital document includes text content that is found in a lookup list. Specifically, FIG. 5 illustrates that a digital document 500 includes tokens 502 representing words, phrases, etc. in the digital document 500. Additionally, in connection with determining whether the digital document 500 includes text content found in a lookup list, the digital document search system 102 determines a selected token 504 from the tokens 502. To illustrate, the digital document search system 102 selects a token based on a position of the token within the digital document 500 (e.g., by extracting a token according to a reading order of the digital document 500).

Furthermore, in connection with the selected token 504, the digital document search system 102 determines a set of sequential tokens 506 corresponding to the selected token 504. For example, the digital document search system 102 determines a plurality of sequential tokens beginning with the selected token 504. The set of sequential tokens 506 thus includes a plurality of sequential tokens with the selected token 504 in a first position followed by a plurality of sequential tokens up to a maximum number of tokens. In one or more aspects, as described in more detail below with respect to FIG. 6, the maximum number of tokens corresponds to the highest possible number of tokens found in any single entry of the lookup list.

In one or more aspects, the digital document search system 102 utilizes a classifier model 508 to determine whether the set of sequential tokens 506 is found in a lookup list via a probabilistic data structure (e.g., a Bloom filter 510) representing the lookup filter. To illustrate, as described above with respect to FIG. 4, the digital document search system 102 generates a hash for the set of sequential tokens 506 in accordance with the Bloom filter 510. The digital document search system 102 also determines whether the set of sequential tokens 506 is found in the lookup filter by comparing the hash of the set of sequential tokens 506 to the bit values in the Bloom filter 510.

Furthermore, the digital document search system 102 utilizes the classifier model 508 to generate a classification 512 for the set of sequential tokens 506 in response to determining whether the set of sequential tokens hashes to the Bloom filter 510. Specifically, the digital document search system 102 can generate the classification 512 to indicate a true or false value corresponding to the set of sequential tokens 506 (e.g., that the set of sequential tokens matches an item in the lookup filter subject to a probability value based on the size of the Bloom filter 510). In additional aspects, the digital document search system 102 generates the classification 512 to indicate whether the set of sequential tokens 506 is found within one or more of a plurality of lookup filters. To illustrate, the classifier model 508 may utilize a plurality of Bloom filters corresponding to a plurality of lookup filters to determine whether the set of sequential tokens 506 is found in one or more of the lookup filters. Thus, even if the set of sequential tokens 506 is not found in one of the lookup filters, the classification 512 can indicate that the set of sequential tokens 506 is found in one or more other lookup filters.

Figure 6:
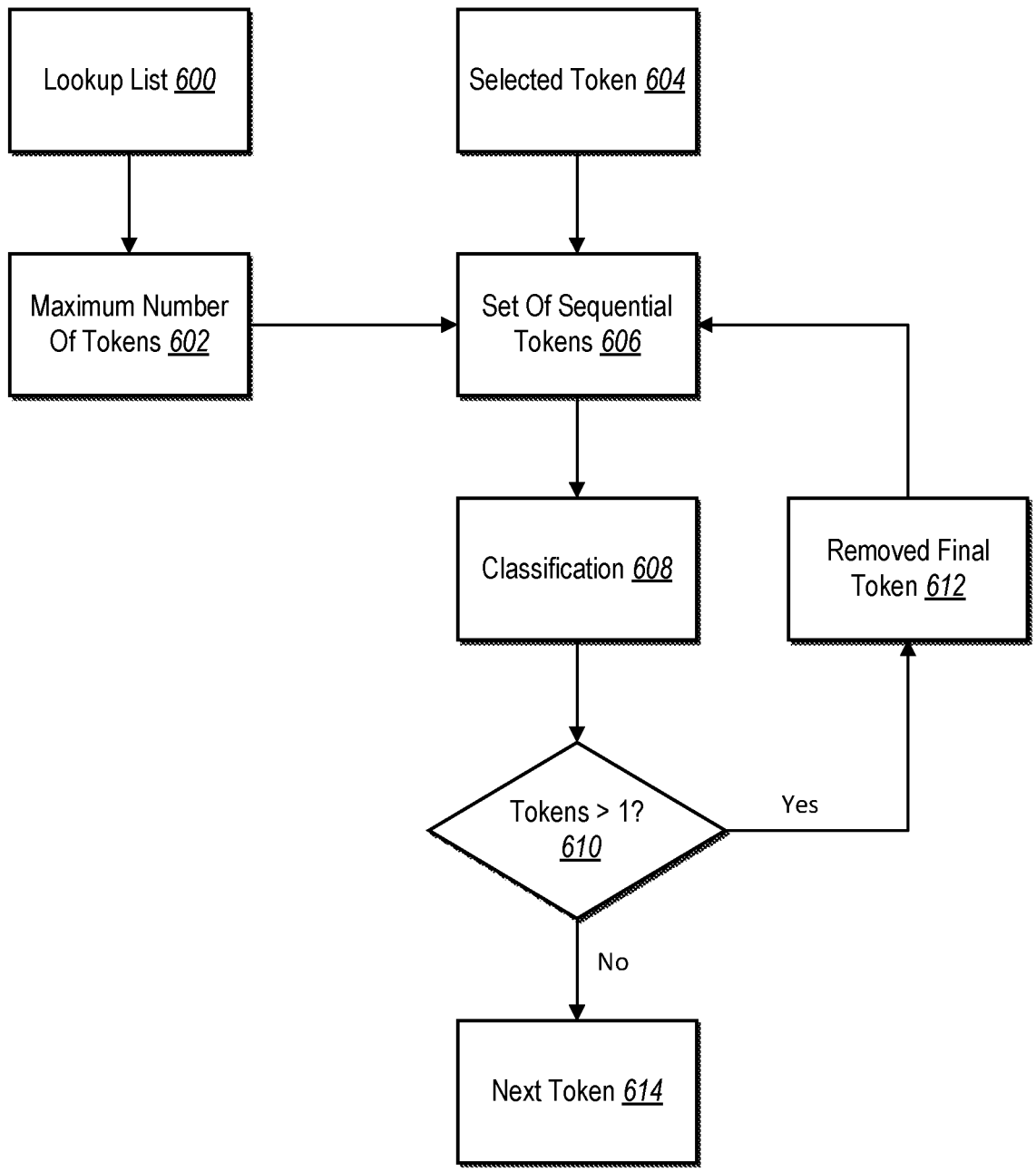
FIG. 6 illustrates an example of the digital document search system iteratively generating classifications and reducing sizes of sets of sequential tokens in a digital document in accordance with one or more aspects.

As mentioned previously, the digital document search system 102 utilizes a maximum size of items in a lookup list to efficiently search for matches between text content in a digital document and a lookup list via a probabilistic data structure. FIG. 6 illustrates that the digital document search system 102 utilizes an iterative process to select, compare, and reduce a size of a selected set of tokens in connection with a probabilistic data structure. More specifically, FIG. 6 illustrates that the digital document search system 102 determines a maximum threshold number of tokens that can match one or more multi-token items in a lookup list for use in selecting and comparing to token sets from a digital document.

As illustrated in FIG. 6, the digital document search system 102 determines a lookup list 600 including a plurality of items related to one or more sets of digital data requirements and/or one or more data processes. Additionally, as mentioned above, the lookup list 600 includes one or more multi-token items related to digital data requirements. For instance, a multi-token item includes more than one token representing a single concept (e.g., a name or a combination of nouns and/or adjectives).

In connection with determining the lookup list 600 for detecting specific data types in one or more digital documents, the digital document search system 102 determines a maximum number of tokens 602 corresponding to the multi-token items in the lookup list 600. For example, the digital document search system 102 determines the maximum number of tokens 602 by determining a token length (i.e., number of separate tokens) of each item in the lookup list 600 and setting the maximum number of tokens 602 based on the longest token length in the lookup list 600. To illustrate, if a longest multi-token item in the lookup list 600 has a token length of three (e.g., three separate tokens), the digital document search system 102 sets the maximum number of tokens 602 to three. In connection with setting the maximum number of tokens 602, the digital document search system 102 stores the maximum number of tokens 602 in metadata associated with the lookup list 600.

In one or more aspects, the digital document search system 102 determines a selected token 604 for analyzing relative to the lookup list 600. For instance, the digital document search system 102 determines the selected token 604 according to a token order in the digital document (e.g., by selecting the first token in the digital document). The digital document search system 102 also determines a set of sequential tokens 606 including the selected token. Thus, the set of sequential tokens 606 includes the selected token 604 at a first (e.g., beginning) position in the set of sequential tokens 606 followed by one or more additional tokens in sequential order according to the order of the digital document.

In additional aspects, the digital document search system 102 generates a classification 608 for the set of sequential tokens 606. In particular, as previously mentioned, the digital document search system 102 generates a probabilistic data structure representing the items in the lookup list 600. The digital document search system 102 utilizes a classifier model to generate the classification 608 for the set of sequential tokens 606 by determining whether the set of sequential tokens 606 is found in the lookup list 600 via the probabilistic data structure. For example, the digital document search system 102 generates the classification 608 to indicate whether the set of sequential tokens 606 is found in the lookup list 600.

In one or more aspects, in response to generating the classification 608, the digital document search system 102 generates an updated set of sequential tokens. For instance, as illustrated in FIG. 6, the digital document search system 102 performs an act 610 of determining whether the number of tokens in the set of sequential tokens 606 is greater than one. In response to determining that the set of sequential tokens 606 has more than one token (e.g., two or more tokens), the digital document search system 102 determines an updated set of sequential tokens for further comparisons.

As an example, the digital document search system 102 determines an updated set of sequential tokens by removing a final token (e.g., a token in a final/last position) from the set of sequential tokens 606. To illustrate, in response to determining that the set of sequential tokens 606 has three tokens, the digital document search system 102 removes the third token to determine an updated set of sequential tokens including only two tokens. FIG. 6 illustrates a removed final token 612 in response to determining that the number of tokens is greater than one in a loop. Accordingly, the digital document search system 102 continues looping through the process of generating classifications for sets of sequential tokens for the selected token 604 relative to the lookup list 600 and removing tokens until the number of tokens in the compared set is equal to one. In one or more aspects, the digital document search system 102 thus utilizes the maximum number of tokens 602 $m$ as a starting set size for classification and removes tokens (e.g., via m−1) until the set size is equal to one.

In response to determining that the number of tokens in a most recently classified set of tokens is not greater than one (e.g., the set includes exactly one token), the digital document search system 102 determines a next token 614. Specifically, the digital document search system 102 selects the next sequential token in the digital document according to the order of tokens in the digital document and begins the process of selecting sets of sequential tokens with the new token. For example, the digital document search system 102 determines a set of sequential tokens with the next token 614 at a first position in the set followed by a plurality of additional tokens up to the maximum number of tokens 602.

As an example of the digital document search system 102 of the process in FIG. 6, the digital document search system 102 determines an input that includes "United States of Antarctica" for comparison to a lookup list related to names of countries or geographical regions. The digital document search system 102 selects a first token ("United") and, in response to determining that the maximum number of tokens for multi-token items in the lookup list is 4, the digital document search system 102 determines a set of sequential tokens as "United States of Antarctica". The digital document search system 102 compares the set of tokens to the lookup list via a probabilistic data structure and determines that the set of tokens is not a match. Accordingly, the digital document search system 102 determines that the set of tokens has more than one token and removes "*Antarctica*" to determine an updated set as "United States of".

The digital document search system 102 iteratively classifies the sets of tokens and reduces the set size, finding that "United States" is a match with an item in the lookup list, while "United" is not a match. In response to classifying the selected token by itself relative to the lookup list, the digital document search system 102 selects a new token for comparing according to the maximum number of tokens. To illustrate, the digital document search system 102 selects the next token as "States" and determines a set of sequential tokens as "States of Antarctica", which is the longest possible sequence for the selected token as constrained by the maximum number of tokens of items in the lookup list.

Although the initial set of sequential tokens for "States" in the above example has fewer than the maximum number of tokens due to the input not having any more tokens, the digital document search system 102 can determine an initial set of sequential tokens for a selected token up to the maximum number of tokens based on the input. For example, for an input including "United States of Antarctica is not a real place", the initial set of sequential tokens would be "States of Antarctica is" according to the maximum number of tokens in the lookup list. The digital document search system 102 thus adapts the determination of sets of tokens to the input and the number of tokens in the multi-token items in the lookup list.

Figure 7:
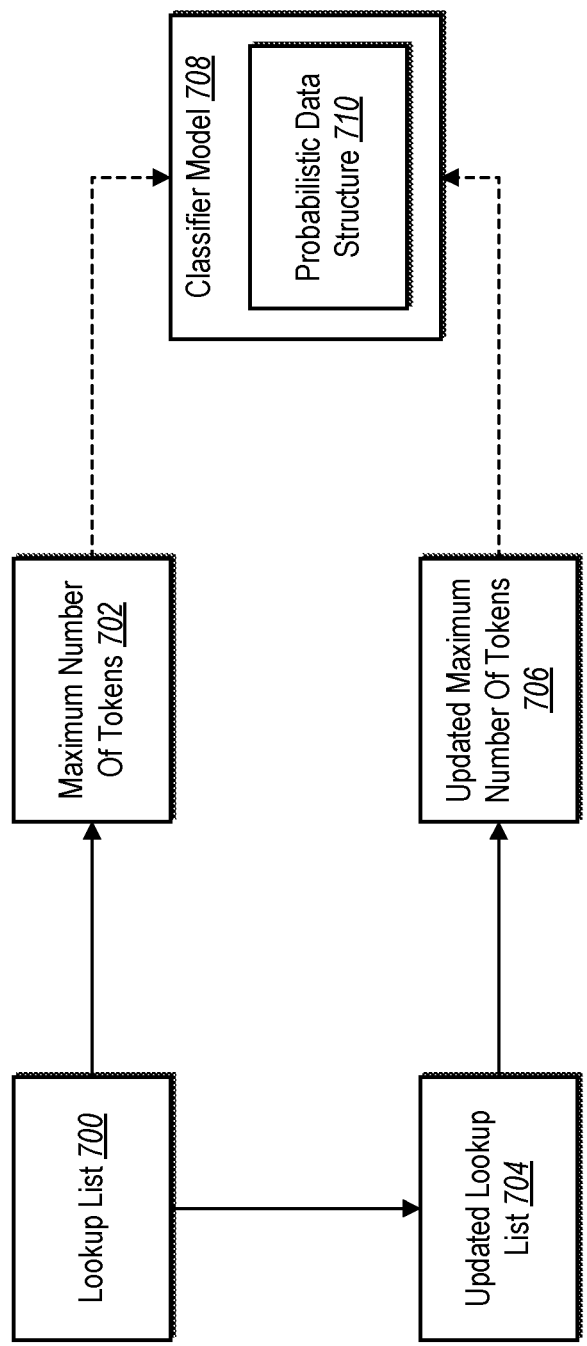
FIG. 7 illustrates an example of the digital document search system updating a maximum number of tokens for a lookup list in accordance with one or more aspects.

In one or more aspects, the digital document search system 102 also manages changes to lookup lists. In particular, FIG. 7 illustrates that the digital document search system 102 detects changes to a lookup list to determine whether to modify a threshold number of tokens for classifying text content via a probabilistic data structure. For example, the digital document search system 102 determines a lookup list 700 including a plurality of items corresponding to one or more sets of digital data requirements. In connection with determining the lookup list 700, the digital document search system 102 also determines a maximum number of tokens 702 corresponding to tokens in the lookup list 700.

According to one or more aspects, the digital document search system 102 also determines that changes to the lookup list 700 result in an updated lookup list 704. To illustrate, the updated lookup list 704 includes one or more items not in the lookup list 700 and/or the lookup list 700 includes one or more items not in the updated lookup list 704. In response to determining the updated lookup list 704, the digital document search system 102 also determines an updated maximum number of tokens 706 corresponding to the items in the updated lookup list 704. For instance, the digital document search system 102 can determine that the updated lookup list 704 has multi-token items with a different maximum token length (e.g., the longest item has a different number of tokens) than the multi-token items of the lookup list 700. As an example, the digital document search system 102 can determine that the maximum number of tokens 702 is four for the lookup list and the updated maximum number of tokens 706 is six for the updated lookup list 704.

In one or more aspects, the digital document search system 102 utilizes a classifier model 708 to generate classifications for text content according to a lookup list and a corresponding maximum number of tokens. Accordingly, prior to the changes to the lookup list 700, the digital document search system 102 utilizes the classifier model 708 with a probabilistic data structure 710 to detect matches to text content in a digital document according to the maximum number of tokens 702. Furthermore, in response to the changes to the lookup list 700 resulting in the updated lookup list 704, the digital document search system 102 utilizes the classifier model 708 with an updated version of the probabilistic data structure 710 (e.g., an updated Bloom filter) to detect matches to text content in a digital document according to the updated maximum number of tokens 706.

Figure 8:
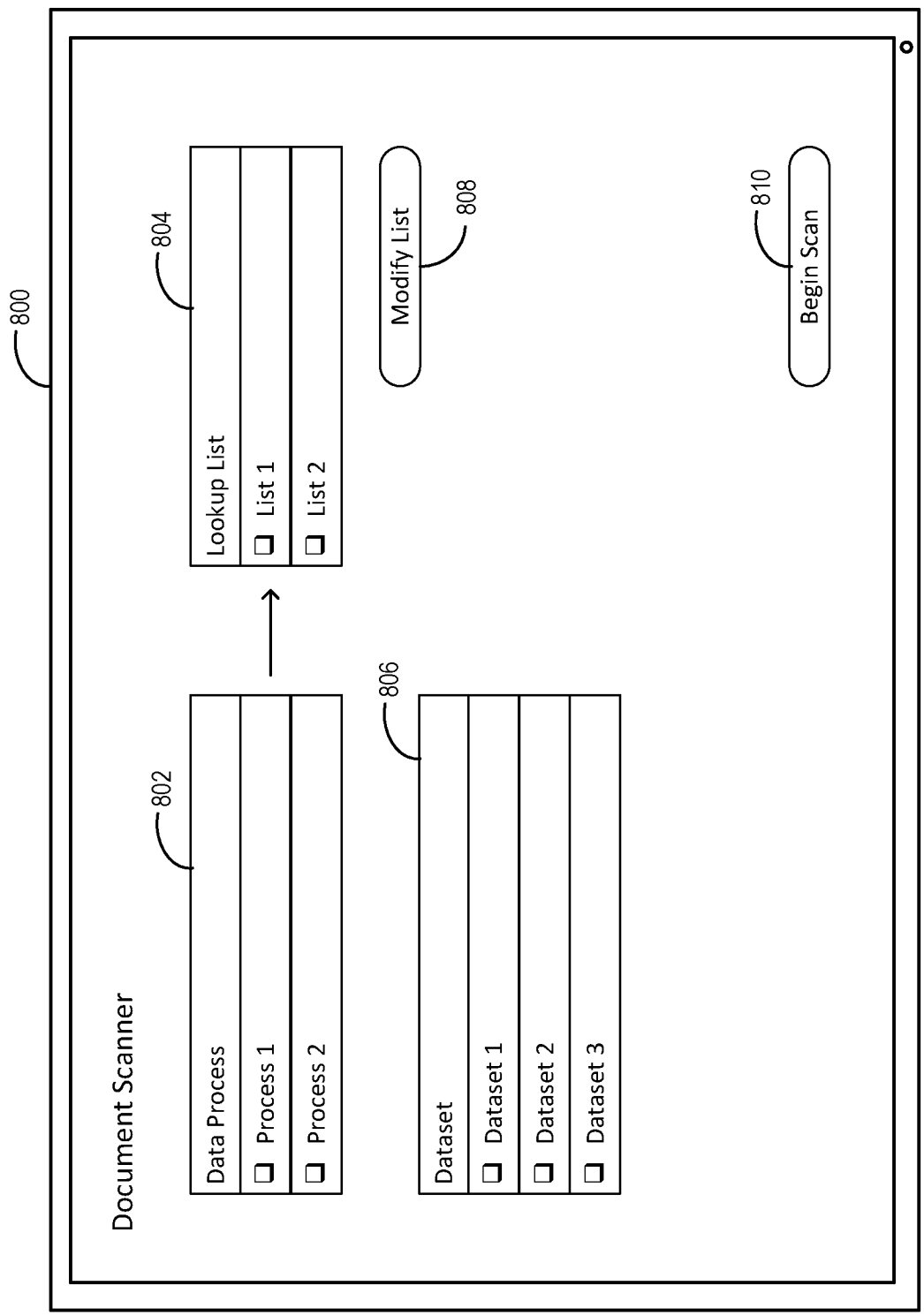
FIG. 8 illustrates an example of a graphical user interface for initiating a scan of a dataset according to a lookup list in accordance with one or more aspects.

As previously mentioned, the digital document search system 102 provides indications of classifications of text content relative to a lookup list within a graphical user interface. FIG. 8 illustrates a graphical user interface of a client device 800 for providing tools to configure and initiate a scan operation to analyze digital documents in connection with one or more data processes. Specifically, the client device 800 displays a plurality of options to select specific configuration settings for analyzing one or more datasets.

To illustrate, the client device 800 displays a process section 802 including one or more data processes for determining specific digital data requirements and/or types of data to identify. The client device 800 can also display a lookup section 804 including one or more lookup lists including items or entities to detect in connection with the data process(es). For example, the client device 800 populates the lookup section 804 with one or more lookup lists in response to a selection of one or more data processes in the process section 802. Furthermore, the client device 800 displays a dataset section 806 including one or more datasets to process in connection with the selected process(es) and lookup list(s). In one or more aspects, the digital document search system 102 initiates a scan to detect content in the selected dataset(s) that matches one or more items in the lookup list(s), such as in response to a selection of a scan element 810.

Additionally, in one or more aspects, the digital document search system 102 provides tools for modifying selected settings associated with a scan operation. For example, FIG. 8 illustrates that the client device 800 displays a modify list element 808 to modify a selected lookup list in the lookup section 804. To illustrate, in response to a selection of the modify list element 808, the client device can display an interface for modifying elements in a lookup list (e.g., via deletion, modification, or addition). In some aspects, the client device also provides tools for adding lookup lists in connection with a selected data process.

In the various examples above, the digital document search system 102 configures or otherwise causes the client device 800 to perform the various display and/or population actions. In some aspects, software of the digital document search system 102 executed on a server remote from the client device 800 transmits instructions and/or data that cause the client device 800 to provide the graphical user interface with the functionality described above. In additional or alternative aspects, software of the digital document search system 102 executed on the client device 800 configures the client device 800 to provide the graphical user interface with the functionality described above.

Figure 9:
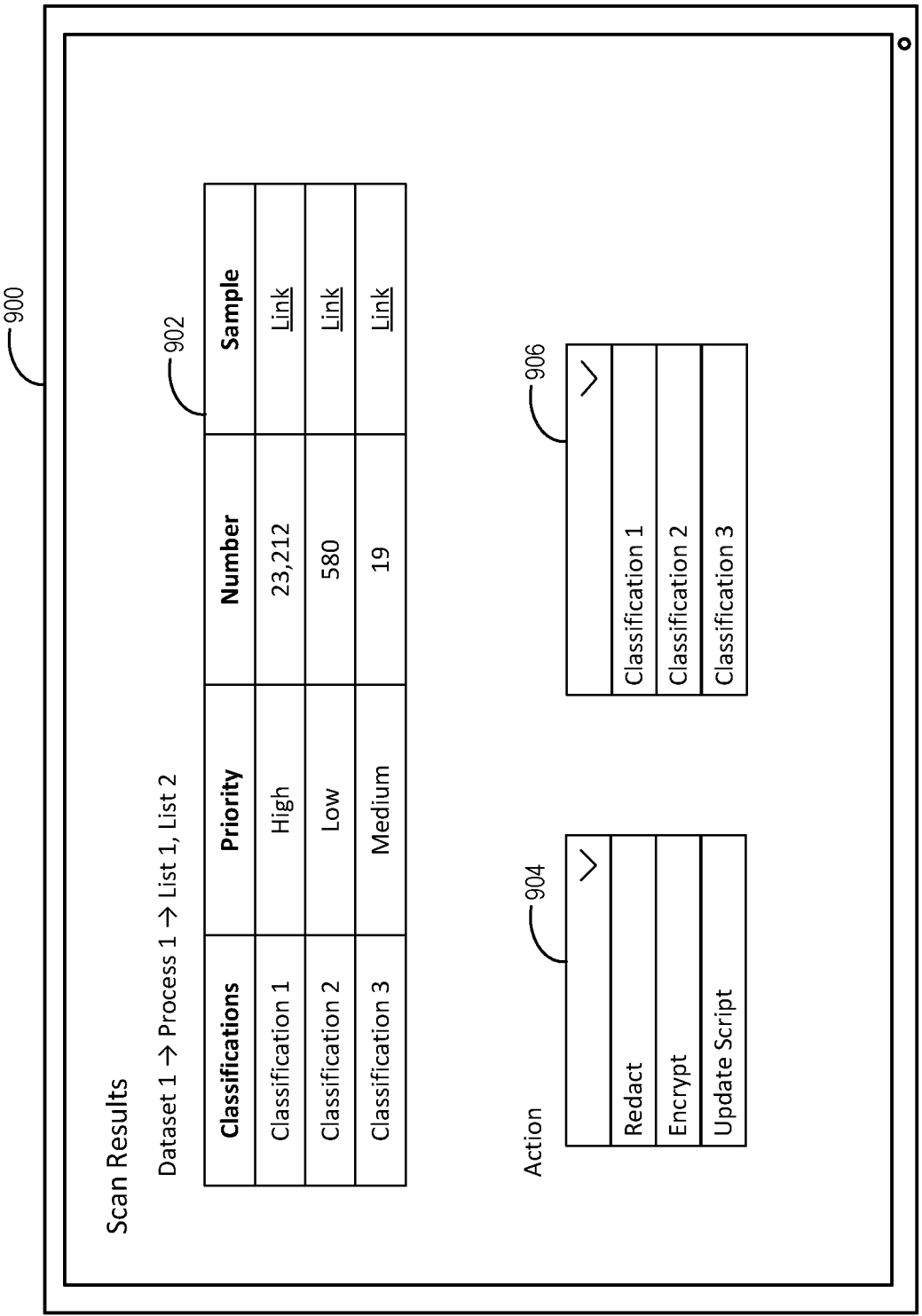
FIG. 9 illustrates an example of a graphical user interface for presenting results of a scan of a dataset in accordance with one or more aspects.

FIG. 9 illustrates a graphical user interface of a client device 900 for displaying scan results of a scan operation. For example, as shown, the client device 900 displays a results section 902 including information about the scan operation. To illustrate, in response to determining that one or more digital documents includes content found in one or more lookup lists, the digital document search system 102 causes the client device to display an indication of the detected content.

In one or more aspects, the scan results include indications of a classification type indicating a specific data process and/or digital data requirement associated with a specific data type detected in the content. Additionally, the scan results can include an indication of a priority level associated with a particular detected data type. To illustrate, some classifications can include higher priority levels (e.g., sensitive data types corresponding to one or more data processes) or lower priority levels (e.g., data types that may be, but are not necessarily, indicative of a data processing issue. Furthermore, the scan results can include a number of instances of specific data types (or digital documents including specific data types) from the dataset(s) found in the lookup lists.

In some aspects, the client device 900 also displays a sample or a link to a sample associated with a detected data type corresponding to a specific classification. For example, in response to detecting a specific data type in a digital document utilizing a probabilistic data structure representing a lookup list, the digital document search system 102 selects one detected instance to display via the client device 900. In another example, the digital document search system 102 identifies a digital document including content a specific data type corresponding to a classification and displays information identifying the digital document. Alternatively, the digital document search system automatically generates a link to a digital document or a location within a digital document corresponding to the detected data type and displays the link within the results section 902.

In additional aspects, the digital document search system 102 provides one or more tools for automatically implementing changes within a computing environment in connection with a specific classification of data. For example, as illustrated in FIG. 9, the client device displays one or more possible actions that the digital document search system 102 can implement in connection with a particular classification. To illustrate, the client device displays an action menu 904 including a plurality of possible action types. The possible action types can include, but are not limited to, automatically redacting data types found in a dataset, encrypting data types found in a dataset, or updating a script (or other database operation) that manages data types found in a dataset. Furthermore, the client device 900 also displays a classification menu 906 that includes one or more classifications indicated in the results section 902.

In the various examples above, the digital document search system 102 configures or otherwise causes the client device 900 to perform the various display and/or population actions. In some aspects, software of the digital document search system 102 executed on a server remote from the client device 900 transmits instructions and/or data that cause the client device 900 to provide the graphical user interface with the functionality described above. In additional or alternative aspects, software of the digital document search system 102 executed on the client device 900 configures the client device 900 to provide the graphical user interface with the functionality described above.

The digital document search system 102 can apply a selected action to instances of data types corresponding to a selected classification in response to a selection of an action in the action menu 904 and a classification in the classification menu 906. For instance, in response to a selection of a redaction action for a first classification, the digital document search system 102 communicates with one or more computing devices storing digital documents including data types classified with the first classification. The digital document search system 102 generates instructions or otherwise causes the computing device(s) to redact the found data types (e.g., redact the tokens matching items in the lookup list(s)) corresponding to the first classification from the digital documents in the dataset. In another example, in response to a selection of an encryption action for a second classification, the digital document search system 102 automatically identifies and encrypts (e.g., using a specified encryption type) digital documents including a specific data type. In a further example, the digital document search system 102 automatically identifies a computer application, function, script, or other software that accesses, stores, or otherwise handles a specific data type to prevent the software from performing specific actions on the digital documents or related digital documents in accordance with a set of digital data requirements.

Figure 10:
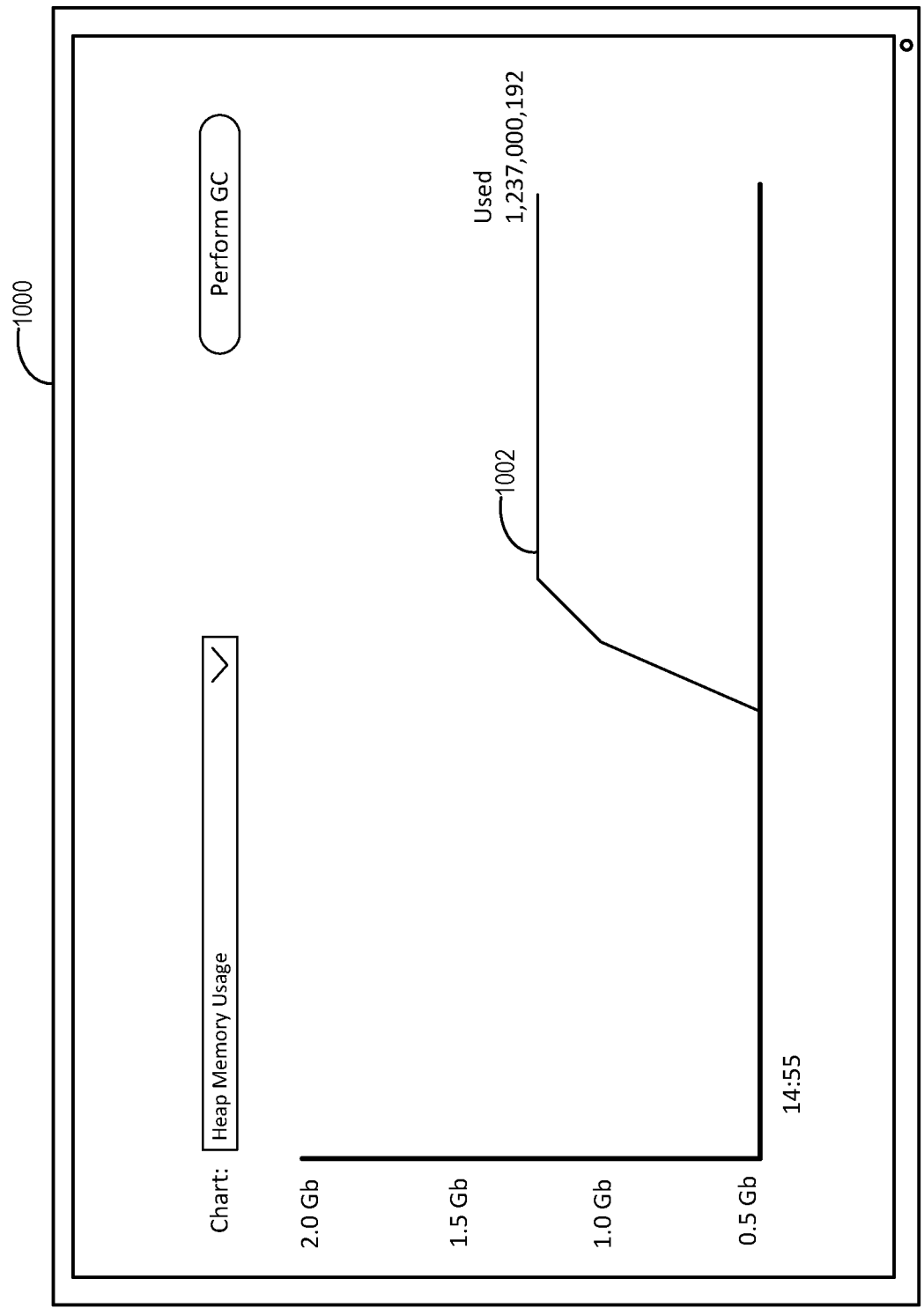
FIG. 10 illustrates an example of a graphical user interface displaying memory usage for a first data structure representing a lookup list in accordance with one or more aspects.
Figure 11:
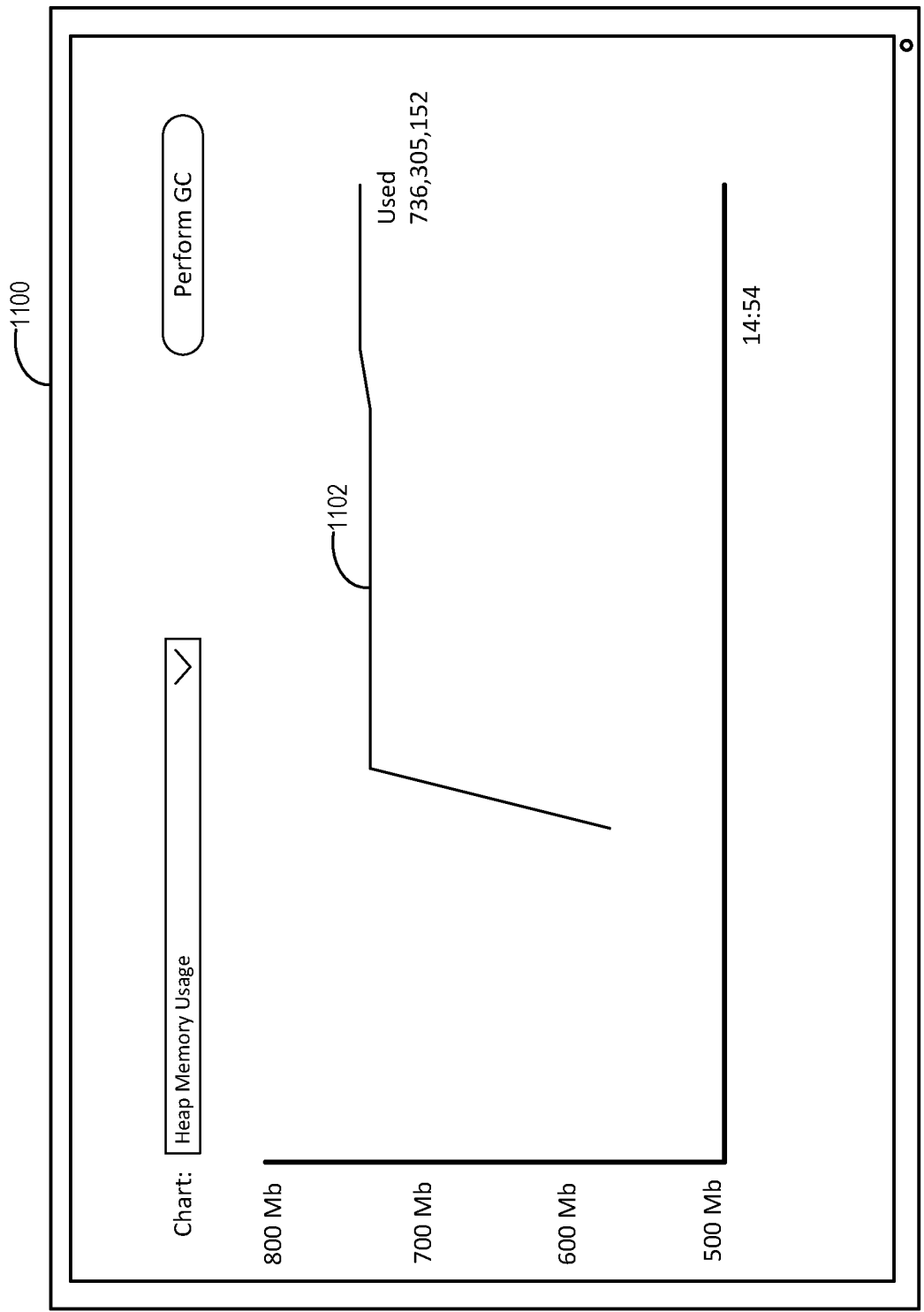
FIG. 11 illustrates an example of a graphical user interface displaying memory usage for a second data structure representing a lookup list in accordance with one or more aspects.
Figure 12:
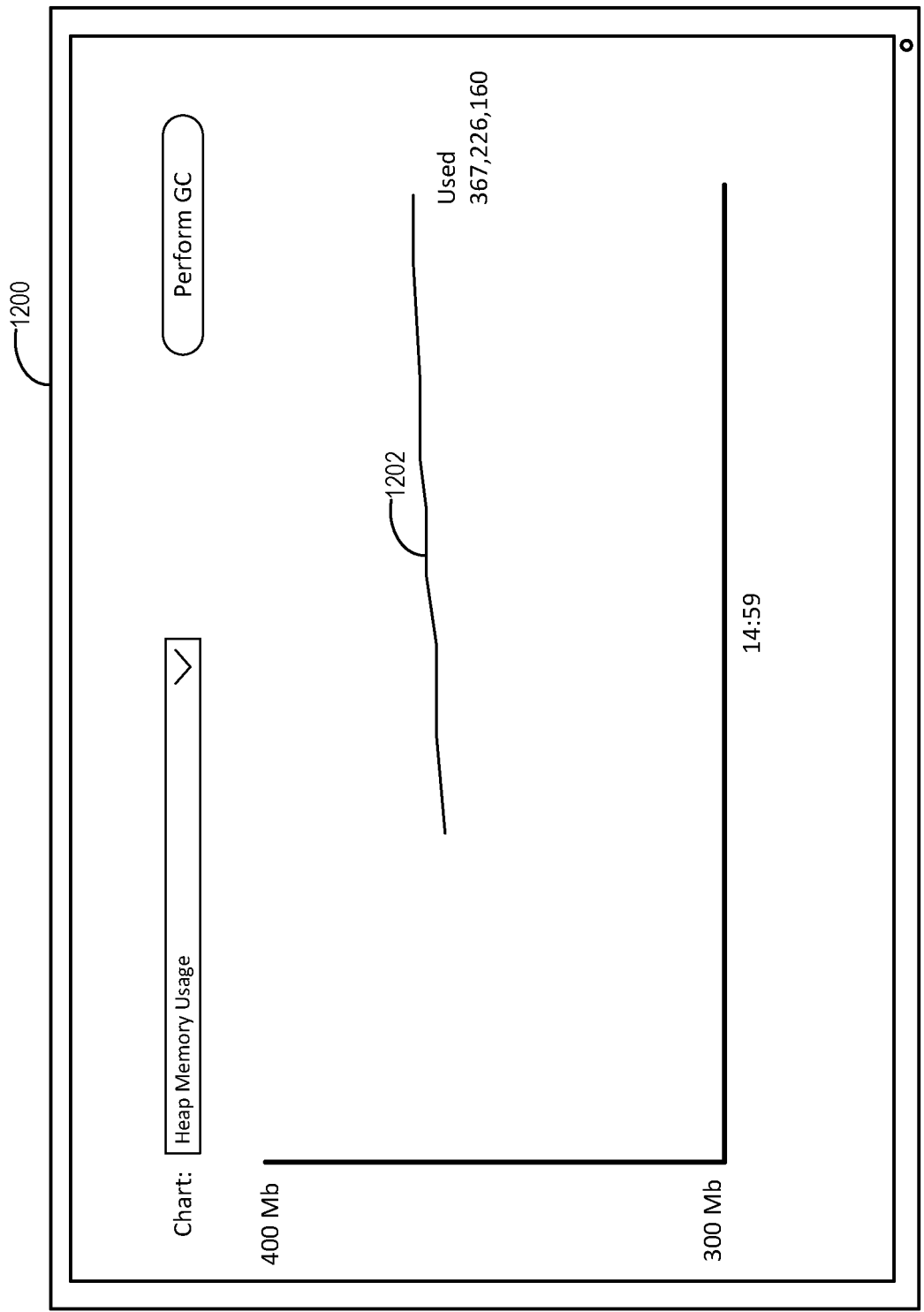
FIG. 12 illustrates an example of a graphical user interface displaying memory usage for a third data structure representing a lookup list in accordance with one or more aspects.

As previously mentioned, the digital document search system 102 provides improved efficiency over computing systems that implement digital document analysis via lookup lists. Specifically, as illustrated in FIGS. 10-12, by leveraging a probabilistic data structure with an iterative search process according to a maximum threshold of tokens corresponding to a lookup list, the digital document search system 102 reduces computer memory usage over conventional systems. More specifically, by reducing the size of a representation of a lookup list stored in memory and limiting the number of tokens when comparing to content in a large number of digital documents, the digital document search system 102 significantly reduces memory usage during the search operation.

FIG. 10 illustrates a first memory usage graph 1000 including memory usage 1002 via a conventional system that utilizes a trie data structure. FIG. 11 illustrates a second memory usage graph 1100 including memory usage 1102 with a probabilistic data structure for single-token items in a lookup list while utilizing a trie data structure for multi-token items. FIG. 12 illustrates a third memory usage graph 1200 including memory usage 1202 with a probabilistic data structure for single-token and multi-token items in a lookup list according to the previously described methods. As shown, utilizing a probabilistic data structure for all items in a lookup list significantly reduces the amount of memory used to perform matching operations.

Figure 13:
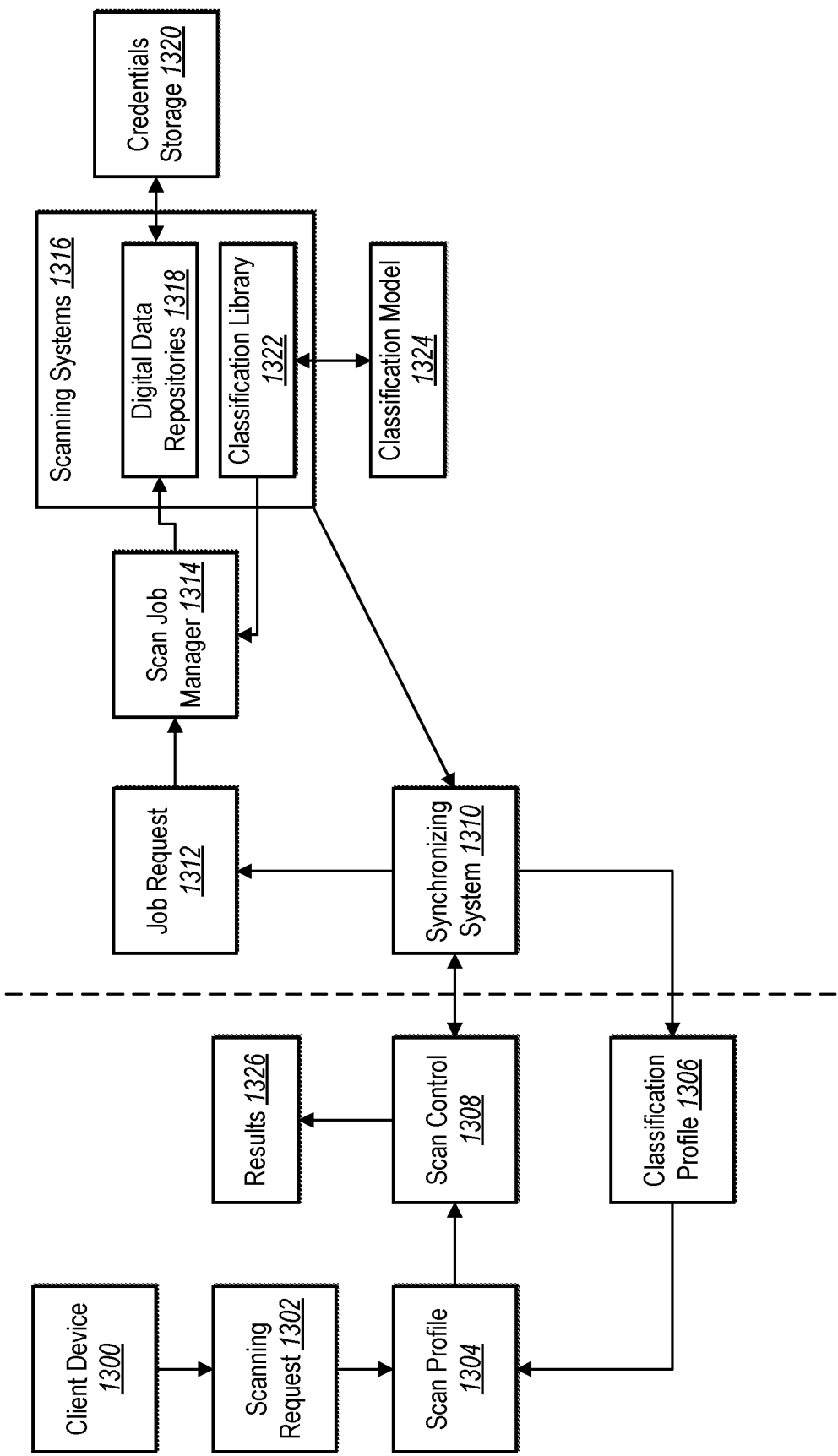
FIG. 13 illustrates an example of a system architecture of the digital document search system executing a digital content scanning request in accordance with one or more aspects.

FIG. 13 illustrates an example of a system architecture of the digital document search system 102 executing a scanning request in accordance with one or more aspects. FIG. 13 illustrates an example architecture of the digital document search system 102 performing operations to scan data associated with a plurality of digital documents. In one or more aspects, as illustrated, a first portion of the digital document search system 102 operates at a cloud-based computing system. Additionally, a second portion of the digital document search system 102 operates on premises (e.g., on one or more computing devices or servers associated with an entity, a shared processing infrastructure, or both).

In one or more aspects, the digital document search system 102 includes or communicates with a client device 1300 that initiates a scanning request 1302 to scan digital documents from one or more data sources. In one or more aspects, the digital document search system 102 determines a scan profile 1304 indicating one or more instructions for scanning the dataset. Furthermore, in some aspects, the scan profile 1304 includes (or is otherwise based on) a classification profile 1306 indicating priority levels for classified content from the dataset, for example, as determined by a user indication of the priority levels in the classification profile 1306 or based on extracted priority levels corresponding to downstream operations. As also illustrated, in one or more aspects, the digital document search system 102 provides the scan profile 1304 to a scan control 1308 that initiates the scanning request in connection with a portion of the digital document search system 102 at computing devices of the entity.

In one or more aspects, an electronic request from a computing system includes a packet or message sent to the digital document search system 102 (e.g., via an API provided by the digital document search system 102) and including processing instructions to perform one or more operations via one or more recipient processors and/or processing threads. For instance, a scanning request can include a request to extract data, modify data, or otherwise perform operations on data in one or more digital documents.

In additional aspects, the digital document search system 102 utilizes the scan control 1308 to provide the scanning request 1302 with the scan profile 1304 to a synchronizing system 1310 at computing devices of the entity. For instance, the synchronizing system 1310 can continuously poll the scan control 1308 for new job requests. In some aspects, the synchronizing system 1310 provides the classification profile 1306 for including with the scan profile 1304. As illustrated in FIG. 13, the digital document search system 102 deploys the synchronizing system 1310 (with additional components) at the computing device(s) of the entity behind network security controls (e.g., outside one or more firewalls) for accessing digital documents (e.g., at the computing devices or via one or more remote computing devices through the firewall(s)). For instance, in the example depicted in FIG. 1, the synchronizing system 1310 (with additional components) could be installed on the third-party system 108 in order to have access to one or more digital data repositories 114 within a computing environment managed or accessed via one or more client devices 106. In this example, the digital document search system 102 includes the scan control 1308 and the synchronizing system 1310. The scan control 1308, installed on a server device 104, can only communicate with the synchronizing system 1310, installed on the third-party system 108, whereas the synchronizing system 1310 (with additional components) can perform various scanning and classification actions described herein.

In one or more aspects, the digital document search system 102 utilizes the synchronizing system 1310 to compare a list of jobs included in a jobs table to determine one or more actions to take. For example, in response to determining that a scan job is present on the cloud-based system but not on the on-premises system, the synchronizing system 1310 initiates a new job. In response to determining that a scan job is present on the on-premises system but not on the cloud-based system, the synchronizing system 1310 cancels the job on the on-premises system. If the synchronizing system 1310 determines that a scan job is present on both systems, the synchronizing system 1310 determines a status of the scan job (e.g., completed, failed, or timed-out) and sends a status notification to the scan control 1308.

In one or more aspects, the digital document search system 102 utilizes the synchronizing system 1310 to submit a job request 1312 to a scan job manager 1314 that manages the initiation and execution of scan jobs at the computing device(s) of the entity and/or via a shared processing infrastructure. For example, the digital document search system 102 utilizes the scan job manager 1314 to communicate with scanning systems 1316 that scan digital data repositories 1318 including a dataset associated with the job request 1312 by leveraging the shared processing infrastructure to perform scanning operations for a plurality of entities. In additional aspects, the scanning systems 1316 include functions, scripts, or applications integrated with the digital data repositories 1318 to access and/or modify entities in the dataset. To illustrate, the scanning systems 1316 communicate with a database management system, a cloud storage devices or local storage devices, and/or storage accounts (e.g., utilizing credentials in a credentials storage 1320) to access digital documents. In some aspects, a listing of jobs received from the scan control 1308 can include job contexts for each scan job, including a scan profile identifier, a base label version (e.g., version of label definitions for pre-seeded labels available to all clients), and a custom label version (e.g., version of label definitions for custom labels specific to the entity).

In one or more aspects, the digital document search system 102 executes a scan job through a pipeline of initiation, distribution, extraction and classification implemented by the scanning systems 1316 on the on-premises system, in which various events are emitted at different stages. Events can include examples such as those in the table below.

|                              |
| ---------------------------- |
| JOB_DISTRIBUTION_STARTED     |
| JOB_CANCELLED                |
| INCREMENT_JOB_SIZE           |
| JOB_DISTRIBUTION_COMPLETED   |
| JOB_DISTRIBUTION_FAILED      |
| TASK_STARTED                 |
| UPDATE_TASK_SIZE             |
| INCREMENT_PROCESSED_SIZE     |
| TASK_COMPLETED               |
| TASK_FAILED                  |
| TASK_CANCELLED               |

The scan job manager 1314 can subscribe to the events and manage the lifecycle of the jobs/tasks based on those events. Additionally, scanning systems 1316 can emit events upon completion of a particular phase of the scan job in a pipeline. In some aspects, the scan job manager 1314 updates a jobs repository to indicate which of these events have been emitted for a given scan job.

Furthermore, as illustrated, the scanning systems 1316 include a classification library 1322 that communicates with a classification model 1324 (e.g., a named entity recognition model or other natural language processing model) to determine classifications associated with the entities. In some aspects, a classification model 1324 can be implemented using one or more classification features described above with respect to FIGS. 2-8.

In one or more aspects, the classification library 1322 also communicates with the scan job manager 1314 to obtain label definitions for labeling entities based on classifications generated by the classification model 1324. Additionally, the classification library 1322 can determine the label definitions according to information from the classification profile 1306 and scan profile 1304.

In one or more aspects, in a scan job, a portion of the digital document search system 102 implemented on-premises can apply one or more of the classifiers to batches of test data extracted by the scanning systems 1316. For example, the batch sizes can be based on a predefined batch size or a user-defined batch size. To illustrate, a configuration setting in the scan profile 1304 can indicate a specific number to sample and classify before initiating sampling and/or classification of additional rows.

According to one or more aspects, in response to executing the job request 1312 utilizing the scanning systems 1316, the digital document search system 102 utilizes the scanning systems 1316 to communicate results data to the synchronizing system 1310. For example, the scanning systems 1316 can provide a catalog and classification results corresponding to the digital content items indicated in the job request 1312 to the synchronizing system 1310. Additionally, as illustrated, the synchronizing system 1310 can provide the catalog and classification results to the scan control 1308, which provides the results 1326 for display and analysis via one or more client devices (e.g., the client device 1300).

In one or more aspects, the digital document search system 102 provides the results 1326 in connection with one or more downstream operations. The downstream operations can involve one or more computing devices (e.g., the client device 1300 or another device/system) performing operations to locate specific data types within the digital data repositories 1318, manage data from the digital data repositories 1318 via automated workflows, control access to data within the digital data repositories 1318, and/or facilitate deletion of data from the digital data repositories 1318. To illustrate, the digital document search system 102 can detect a new type of data (e.g., personal data or sensitive data) stored in a particular data source, which triggers an automated workflow via a software platform that includes or has access to the digital data repositories 1318. The automated workflow can include a series of user interfaces that are dynamically selected, generated, organized, or otherwise configured based on the subject matter of the workflow.

An example of the workflow includes a guided assessment (e.g., via one or more software modules of the platform) in which a series of user interfaces for collecting information (e.g., information regarding one or more of the data sources, the discovered data, the use of the discovered data, etc.) are displayed to a user. The digital document search system 102 (or another system) can dynamically select, configure, and organize the series of interfaces based on the subject matter of the assessment (e.g., selecting interfaces presenting questions related to assessing privacy issues for certain discovered data types) and the data received via various interfaces in the workflow (e.g., skipping a question that is deemed no longer relevant based on an answer to an earlier question by omitting an interface that would present the irrelevant question).

In one or more aspects, the digital document search system 102 (or another system) can utilize a guided assessment to determine a sensitivity of a newly discovered data type, identify risks associated with the new data type, or develop a plan to manage risks associated with the new data type. Furthermore, the system may utilize the automated workflow to notify appropriate users of the new data type, implement appropriate security controls to protect the new data type, or monitor the new data type for potential security/privacy risks. Accordingly, the digital document search system 102 can execute an assessment in response to one or more user inputs or automatically in response to detecting a data type in a particular source and execute an automated workflow to perform one or more computing operations based on the assessment and/or otherwise in connection with detecting the data type.

Additionally, or alternatively, the digital document search system 102 determines data types stored in one or more data sources and uses the determined data types to implement purpose-based access controls. For instance, the digital document search system 102 can determine that access to certain data may be subject to a particular purpose for accessing the data. To illustrate, a storage computing system may receive a request for credit card data or other financial data stored on the storage computing system to use in processing a purchase for a first data subject via a website.

In an additional example, the storage computing system may receive a second request for credit card data to use in displaying to a second data subject on the website to remind the second data subject of the credit card data previously saved to use in purchases (e.g., in a cookie or other digital document). In such an example, the credit card data (e.g., entire credit card number) may not necessarily be needed for display to the second data subject, while a portion of the credit card data (e.g., a partially obfuscated or modified credit card number) may be sufficient for identification by the data subject. Therefore, the storage computing system may determine specific access controls for the credit card data based on the different purposes associated with the requests for the credit card data. Such access controls may not only be applicable with respect to the entity requesting access to the data, but may also be applicable to how the data is displayed (e.g., modified) or used once accessed by the entity.

In either case, improved methods for classifying data contained in a storage system (i.e., determining that data source X includes credit card data) by the digital document search system 102 facilitates the application of access-control policies (e.g., which implement certain purpose restrictions) that selectively modify datasets returned in response to a query so that the datasets are compliant with the purpose restrictions implemented via the access-control policies. For instance, a user of the computing environment that includes the data sources may have an account with a certain role that is assigned certain permissions. The permissions may allow access to certain types of data in certain types of data source for certain purposes associated with the role. Thus, the digital document search system 102 facilitates purpose-based access control to data based on the classification applied to the data. This ensures that the personal data is only accessed by authorized users (e.g., user accounts) for authorized purposes.

Additionally or alternatively, the digital document search system 102 assists in the automated detection and remediation of data retention policies. For example, the digital document search system 102 detects a certain type of data stored in a data source, such as personal data or other data considered sensitive for legal, regulatory, or policy reasons. The digital document search system 102 also detects one or more dates associated with the data (e.g., data of a document's creation, date contained within a document, etc.). The combination of the determined type of data plus other criteria, such as the date, indicates that retention of the data constitutes a policy violation, such as a data retention policy. A software program or suite that includes the digital document search system 102 or that communicates with the digital document search system 102 (e.g., via an integration between the software program and the digital document search system 102) can automatically delete (or automatically prompt a user to delete) the data that violates the policy.

For example, the digital document search system 102 may determine that a data source contains personal data that was created more than 13 years ago. A software program that has access to the digital document search system 102 (e.g., via an integration between the software program and a SaaS platform hosting the digital document search system 102) may automatically delete the personal data, as it is no longer required to be retained under the organization's data retention policy. The automatic deletion may be automated (e.g., without requiring any user intervention) via the digital document search system 102 or partially automated (e.g., by presenting a user with a prompt or screen identifying the data to be deleted and proceeding with the deletion upon receiving the user's confirmation).

Although FIG. 13 illustrates that the digital document search system 102 utilizes a plurality of components within a cloud-based system and a plurality of components at on premises devices of a single entity device, the digital document search system 102 can implement data prioritization scanning for a plurality of entity devices. To illustrate, the digital document search system 102 can integrate separate synchronizing systems, scan job managers, and scanning systems at computing devices of each entity device that issues a scanning request to the components within the cloud-based system. For instance, the digital document search system 102 can utilize the scan control 1308 to manage scanning requests for a plurality of entity devices and communicate with a plurality of separate synchronizing systems at different computing devices of the different entity devices.

Additionally, as mentioned above, the digital document search system 102 can utilize a first set of operations to manage a scan profile 1304 and a scan control 1308 for implementing a scanning request 1302 and providing results 1326 of the scanning request via a client device 1300 at a first computing system (e.g., a cloud-based computing system) while communicating with a shared processing infrastructure. Additionally, the digital document search system 102 can utilize a second set of operations to manage a synchronizing system 1310, a scan job manager 1314, and scanning systems 1316 to scan data in digital data repositories 1318 and classify the data utilizing a classification model 1324 at a second computing system (e.g., one or more computing devices or servers at one or more locations of an entity) while communicating with the shared processing infrastructure.

In some aspects, the digital document search system 102 utilizes one or more other configurations, such that one or more portions described above in connection with the first computing system are instead part of the second computing system, or vice-versa. Thus, the digital document search system 102 can utilize several different computing devices (e.g., cloud-based devices or on premises devices) to perform various operations associated with classifying and routing digital content items. In additional aspects, the digital document search system 102 performs one or more operations described herein by utilizing one or more software applications at one or more computing devices to generate instructions that cause one or more additional computing devices to perform one or more computing operations. As an example, a cloud-based computing application classifies a digital content item by generating instructions that cause a server on premises of an organizational entity to utilize a classification model to generate a classification for entities of a webpage/domain.

In one or more aspects, the components deployed on the computing device(s) of the entity are part of a discovery agent for detecting data sources, datasets, and data types via data extraction and classification. The digital document search system 102 can utilize the discovery agent to identify a data source, scan the data source, tag the data source (e.g., tag data in the data source), and send and classify the respective set of data in accordance with the tagged data. In some instances, by utilizing the discovery agent, the digital document search system 102 generates metadata associated with the entities of the webpages/domains to indicate results of the scanning and classification by the discovery agent. Additionally, the discovery agent can include one or more virtual machines for storing data and/or including/executing scanning operations or classifying operations.

In additional aspects, the digital document search system 102 configures the discovery agent to reduce an impact on a performance of the computing devices, servers, etc. For instance, the digital document search system 102 can configure the discovery agent to utilize bandwidth throttling techniques, such as by limiting scanning and other processing steps to non-peak times. The digital document search system 102 can also configure the discovery agent to limit performance of such operations to backup applications and data storage locations (e.g., by using sampling techniques to decrease a number of files to scan during the data discovery process).

Figure 14:
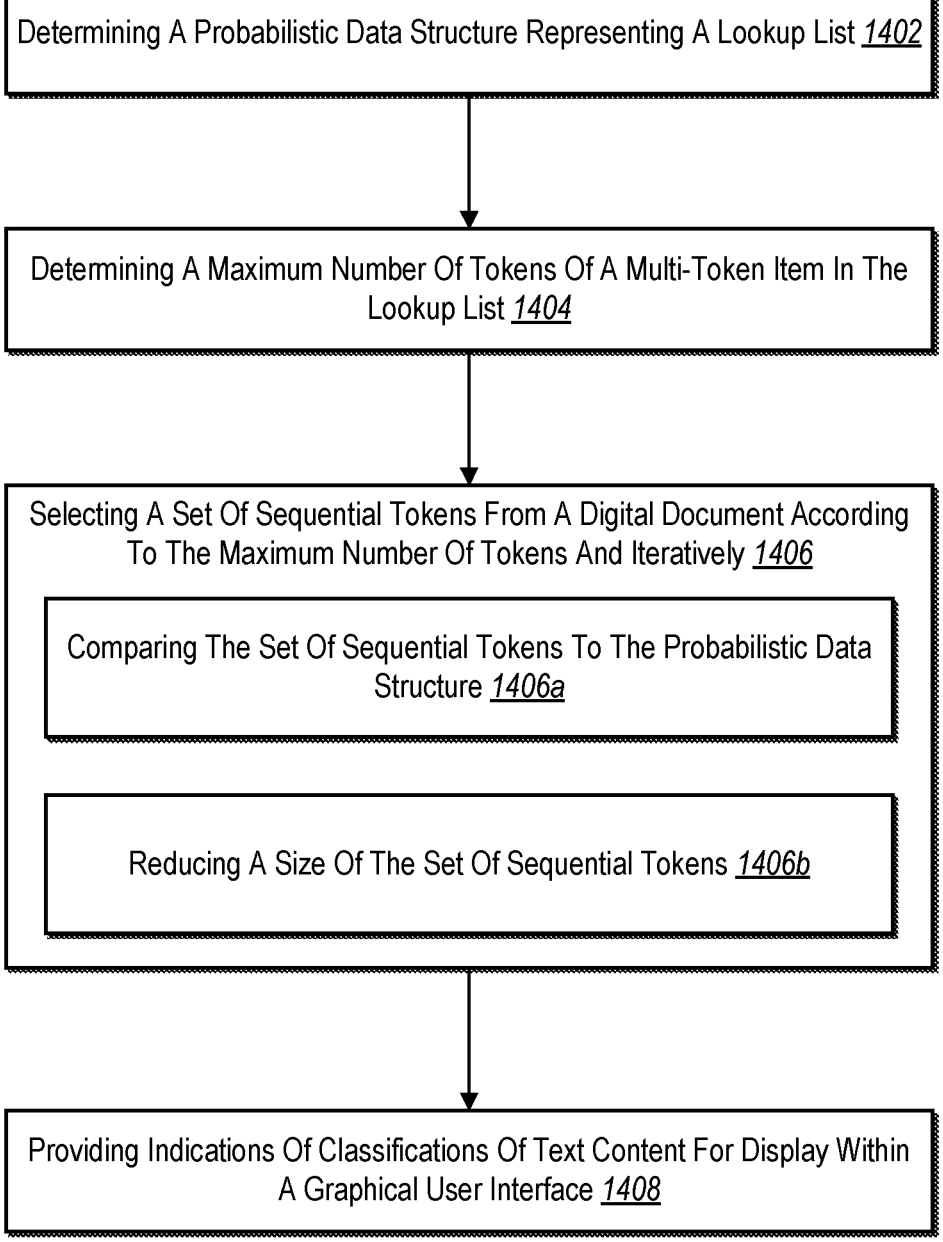
FIG. 14 illustrates an example flowchart of a process for classifying text content in a digital document via a lookup list hashed to a probabilistic data structure in accordance with one or more aspects.

Turning now to FIG. 14, this figure shows a flowchart of a process 1400 of classifying text content in a digital document via a lookup list hashed to a probabilistic data structure. While FIG. 14 illustrates acts according to one aspect, alternative aspects may omit, add to, reorder, and/or modify any of the acts shown in FIG. 14. The acts of FIG. 14 can be performed as part of a method. Alternatively, a non-transitory computer readable medium can comprise instructions, that when executed by one or more processors, cause a computing device to perform the acts of FIG. 14. In still further aspects, a system can perform the acts of FIG. 14.

As shown, the process 1400 includes an act 1402 of determining a probabilistic data structure representing a lookup list. In some aspects, act 1402 is implemented using one or more examples described above with respect to FIGS. 3-4. The process 1400 also includes an act 1404 of determining a maximum number of tokens of a multi-token item in the lookup list. In some aspects, act 1404 is implemented using one or more examples described above with respect to FIG. 6. Additionally, the process 1400 includes an act 1406 of selecting a set of sequential tokens from a digital document according to the maximum number of tokens while iteratively performing an act 1406a of comparing the set of sequential tokens to the probabilistic data structure and an act 1406b of reducing a size of the set of sequential tokens. In some aspects, act 1406, act 1406a, and act 1406b are implemented using one or more examples described above with respect to FIGS. 5 and 6. The process 1400 also includes an act 1408 of providing indications of classifications of text content for display within a graphical user interface. In some aspects, act 1408 is implemented using one or more examples described above with respect to FIG. 8.

In one or more aspects, act 1402 involves determining a probabilistic data structure comprising a bit vector with sets of bit values mapped to a plurality of items in a lookup list, the plurality of items including one or more multi-token items. For example, act 1402 can involve extracting an item from the lookup list, the item comprising more than one token. Act 1402 can also involve mapping the item to a set of bit values in the bit vector of the probabilistic data structure by toggling the set of bit values, the probabilistic data structure comprising a Bloom filter. Act 1402 an involve determining a probabilistic data structure comprising a bit vector with sets of bit values mapped to a plurality of items in a lookup list, the plurality of items including one or more multi-token items.

Act 1402 can also involve determining the probabilistic data structure comprises generating a Bloom filter by mapping the plurality of items of the lookup list to the sets of bit values in the bit vector. In some aspects, act 1402 involves detecting one or more modifications to the lookup list and modifying the Bloom filter in response to the one or more modifications to the lookup list.

Act 1402 can involve determining the selected token according to an order of a plurality of tokens in the digital document. Act 1402 can involve determining the set of sequential tokens comprising the selected token and one or more additional tokens sequential to the selected token according to the order of the plurality of tokens in the digital document to include a total number of tokens equal to the maximum number of tokens.

Act 1404 can involve determining a maximum number of tokens of the one or more multi-token items in the lookup list. Act 1404 can involve extracting the plurality of items from the lookup list, determining the maximum number of tokens of the one or more multi-token items from the plurality of items in the lookup list, and generating metadata for the lookup list comprising the maximum number of tokens.

Act 1404 can also involve can include determining, in response to detecting an updated version of the lookup list, an updated maximum number of tokens corresponding to items in the updated version of the lookup list. The process 1400 can include generating classifications for text content in one or more digital documents of the digital data repository utilizing the updated maximum number of tokens. In some aspects, act 1404 is implemented using one or more examples described above with respect to FIG. 7.

For example, act 1404 can involve determining an updated maximum number of tokens in response to the one or more modifications to the lookup list. Act 1404 can also involve modifying metadata for the Bloom filter indicating the updated maximum number of tokens.

Act 1406 can involve generating classifications for text content in a digital document of a digital data repository by iteratively. Act 1406a can involve comparing, according to a maximum number of tokens of the one or more multi-token items in the lookup list, a set of sequential tokens comprising a selected token in the digital document to the sets of bit values mapped to the plurality of items in the lookup list. Act 1406b can involve reducing a number of tokens in the set of sequential tokens for a subsequent comparison. In some aspects, acts 1406, 1406a, and 1406b are implemented using one or more examples described above with respect to FIGS. 5 and 6.

Act 1406 can involve determining, according to the maximum number of tokens, the set of sequential tokens comprising the selected token at a first position in the set of sequential tokens. Act 1406 can also involve determining whether the set of sequential tokens matches a multi-token item in the lookup list by comparing the set of sequential tokens to the sets of bit values mapped to the plurality of items in the lookup list. Act 1406 can involve reducing the number of tokens in the set of sequential tokens by removing a final token in the set of sequential tokens to determine an updated set of sequential tokens.

Act 1406 can also involve determining whether the updated set of sequential tokens matches one or more items in the lookup list by comparing the updated set of sequential tokens to the sets of bit values mapped to the plurality of items in the lookup list. Act 1406 can further involve iteratively comparing the set of sequential tokens comprising the selected token to the sets of bit values and reducing the number of tokens in the set of sequential tokens until the set of sequential tokens comprises only the selected token. Act 1406 can also involve selecting, for comparing to the sets of bit values, an additional set of sequential tokens comprising an additional selected token at a first position in the additional set of sequential tokens according to the maximum number of tokens.

Act 1406 can also involve generating classifications for text content in an additional digital document of the digital data repository utilizing the updated maximum number of tokens by determining the updated maximum number of tokens from the metadata of the Bloom filter.

Act 1406 can involve determining the selected token in the digital document according to an order of tokens of the digital document. Act 1406 can also include determining the set of sequential tokens comprising the selected token at a first position in the set of sequential tokens and a total number of tokens equal to the maximum number of tokens.

Act 1406 can further involve reducing the number of tokens in the set of sequential tokens by removing a final token in the set of sequential tokens to generate an updated set of sequential tokens. Act 1406 can also involve comparing the updated set of sequential tokens to the sets of bit values mapped to the plurality of items in the lookup list.

In one or more aspects, act 1406 involves generating, for the selected token in the digital document, a plurality of classifications of text content in the digital document by comparing the set of sequential tokens to the sets of bit values of the probabilistic data structure and iteratively reducing tokens in the set of sequential tokens for comparing to the sets of bit values.

Act 1406 can involve comparing the set of sequential tokens comprising the selected token in a first position and the one or more additional tokens in the order of the plurality of tokens in the digital document to the sets of bit values of the probabilistic data structure. Act 1406 can also involve removing a final token in the set of sequential tokens to determine an updated set of sequential tokens for a subsequent comparison to the sets of bit values of the probabilistic data structure.

Act 1408 can involve providing, for display within a graphical user interface of a client device, indications of the classifications of the text content in the digital document relative to the plurality of items in the lookup list. For example, act 1408 can involve determining that a first subset of the set of sequential tokens comprises a first classification indicating that the first subset is located in the lookup list. Act 1408 can involve determining that a second subset of the set of sequential tokens comprises a second classification indicating that the second subset is not located in the lookup list. Act 1408 can also involve providing indications of the first classification and the second classification for display within the graphical user interface of the client device.

In one or more aspects, the process 1400 also includes acts for causing a computing device to modify the digital document or a digital data repository operation of the digital data repository based on the classifications of the text content in the digital document. For example, the process 1400 can include causing a computing device to redact one or more tokens in the digital document in response to determining that one or more classifications indicate that the one or more tokens match one or more items in the lookup list. In some aspects, such operations are implemented using one or more examples as described above with respect to FIGS. 2 and 9.

The process 1400 can also include determining that a classification of a set of tokens in the digital document indicates that the set of tokens corresponds to a multi-token item in the lookup list. The process 1400 can include causing the computing device to redact the set of tokens from the digital document.

The process 1400 can also include causing, in response to a selection of an indication of a classification of a set of tokens in the digital document that matches a multi-token item in the lookup list, a computing device to redact the set of tokens in the digital document.

Aspects of the present disclosure may comprise or utilize a special purpose or general-purpose computer including computer hardware, such as, for example, one or more processors and system memory, as discussed in greater detail below. Aspects within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, aspects of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some aspects, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Aspects of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 15:
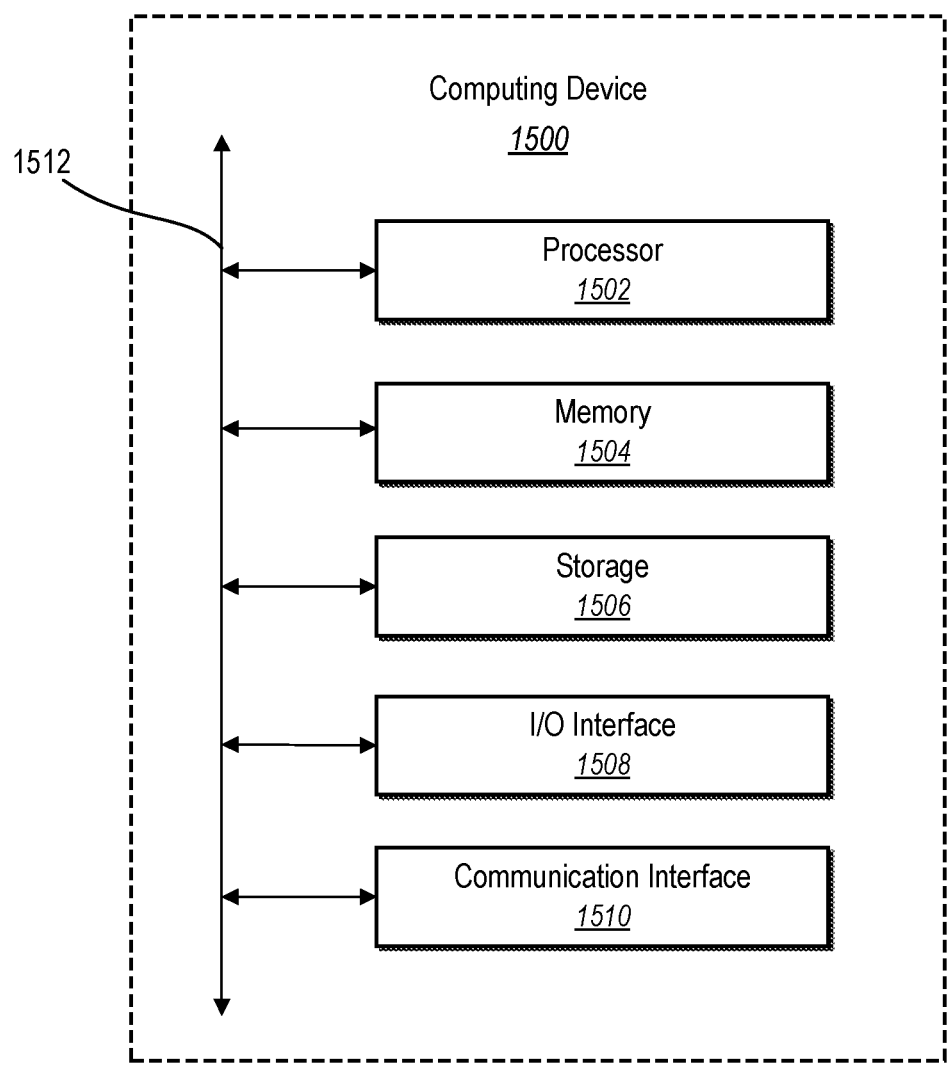
FIG. 15 illustrates an example of a computing device in accordance with one or more aspects.

FIG. 15 illustrates a block diagram of exemplary computing device 1500 that may be configured to perform one or more of the processes described above. One will appreciate that one or more computing devices such as the computing device 1500 may implement the system(s) of FIG. 1. As shown by FIG. 15, the computing device 1500 can comprise a processor 1502, a memory 1504, a storage device 1506, an I/O interface 1508, and a communication interface 1510, which may be communicatively coupled by way of a communication infrastructure 1512. In certain aspects, the computing device 1500 can include fewer or more components than those shown in FIG. 15. Components of the computing device 1500 shown in FIG. 15 will now be described in additional detail.

In one or more aspects, the processor 1502 includes hardware for executing instructions, such as those making up a computer program. As an example, and not by way of limitation, to execute instructions for dynamically modifying workflows, the processor 1502 may retrieve (or fetch) the instructions from an internal register, an internal cache, the memory 1504, or the storage device 1506 and decode and execute them. The memory 1504 may be a volatile or non-volatile memory used for storing data, metadata, and programs for execution by the processor(s). The storage device 1506 includes storage, such as a hard disk, flash disk drive, or other digital storage device, for storing data or instructions for performing the methods described herein.

The I/O interface 1508 allows a user to provide input to, receive output from, and otherwise transfer data to and receive data from computing device 1500. The I/O interface 1508 may include a mouse, a keypad or a keyboard, a touch screen, a camera, an optical scanner, network interface, modem, other known I/O devices or a combination of such I/O interfaces. The I/O interface 1508 may include one or more devices for presenting output to a user, including, but not limited to, a graphics engine, a display (e.g., a display screen), one or more output drivers (e.g., display drivers), one or more audio speakers, and one or more audio drivers. In certain aspects, the I/O interface 1508 is configured to provide graphical data to a display for presentation to a user. The graphical data may be representative of one or more graphical user interfaces and/or any other graphical content as may serve a particular implementation.

The communication interface 1510 can include hardware, software, or both. In any event, the communication interface 1510 can provide one or more interfaces for communication (such as, for example, packet-based communication) between the computing device 1500 and one or more other computing devices or networks. As an example, and not by way of limitation, the communication interface 1510 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1510 may facilitate communications with various types of wired or wireless networks. The communication interface 1510 may also facilitate communications using various communication protocols. The communication infrastructure 1512 may also include hardware, software, or both that couples components of the computing device 1500 to each other. For example, the communication interface 1510 may use one or more networks and/or protocols to enable a plurality of computing devices connected by a particular infrastructure to communicate with each other to perform one or more aspects of the processes described herein. To illustrate, various examples described above with respect to FIGS. 1-14 can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary aspects thereof. Various aspects and aspects of the present disclosure(s) are described with reference to details discussed herein, and the accompanying drawings illustrate the various aspects. The description above and drawings are illustrative of the disclosure and are not to be construed as limiting the disclosure. Numerous specific details are described to provide a thorough understanding of various aspects of the present disclosure.

The present disclosure may be embodied in other specific forms without departing from its spirit or essential characteristics. The described aspects are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:
determining, by processing hardware, a probabilistic data structure comprising a bit vector with sets of bit values mapped to a plurality of items in a lookup list, the plurality of items including one or more multi-token items;
determining, by the processing hardware, a maximum number of tokens of the one or more multi-token items in the lookup list;
determining, by the processing hardware and for a selected token from text content in a digital document, a set of sequential tokens including the selected token based on the maximum number of tokens;
generating, by the processing hardware, classifications for the text content in the digital document of a digital data repository by iteratively:
comparing the set of sequential tokens to the sets of bit values mapped to the plurality of items in the lookup list;
reducing a number of tokens in the set of sequential tokens for a subsequent comparison; and
providing, for display within a graphical user interface of a client device, indications of the classifications of the text content in the digital document relative to the plurality of items in the lookup list.

2. The computer-implemented method of claim 1, wherein determining the probabilistic data structure comprises:
extracting an item from the lookup list, the item comprising more than one token; and
mapping the item to a set of bit values in the bit vector of the probabilistic data structure by toggling the set of bit values, the probabilistic data structure comprising a Bloom filter.

3. The computer-implemented method of claim 1, further comprising:
extracting the plurality of items from the lookup list;
determining the maximum number of tokens of the one or more multi-token items by identifying a longest token length of the plurality of items in the lookup list; and
generating metadata for the lookup list comprising the maximum number of tokens.

4. The computer-implemented method of claim 3, further comprising:
determining, in response to detecting an updated version of the lookup list, an updated maximum number of tokens corresponding to items in the updated version of the lookup list; and
generating classifications for text content in one or more digital documents of the digital data repository utilizing the updated maximum number of tokens.

5. The computer-implemented method of claim 1, wherein generating the classifications comprises:
determining, according to the maximum number of tokens, the set of sequential tokens comprising the selected token at a first position in the set of sequential tokens;
determining whether the set of sequential tokens matches a multi-token item in the lookup list by comparing the set of sequential tokens to the sets of bit values mapped to the plurality of items in the lookup list; and
reducing the number of tokens in the set of sequential tokens by removing a final token in the set of sequential tokens to determine an updated set of sequential tokens.

6. The computer-implemented method of claim 5, wherein generating the classifications comprises determining whether the updated set of sequential tokens matches one or more items in the lookup list by comparing the updated set of sequential tokens to the sets of bit values mapped to the plurality of items in the lookup list.

7. The computer-implemented method of claim 1, wherein generating the classifications comprises:
iteratively comparing the set of sequential tokens comprising the selected token to the sets of bit values and reducing the number of tokens in the set of sequential tokens until the set of sequential tokens comprises only the selected token; and
selecting, for comparing to the sets of bit values, an additional set of sequential tokens comprising an additional selected token at a first position in the additional set of sequential tokens according to the maximum number of tokens.

8. The computer-implemented method of claim 1, wherein providing the indications of the classifications of the text content comprises:
determining that a first subset of the set of sequential tokens comprises a first classification indicating that the first subset is located in the lookup list;
determining that a second subset of the set of sequential tokens comprises a second classification indicating that the second subset is not located in the lookup list; and providing indications of the first classification and the second classification for display within the graphical user interface of the client device.

9. The computer-implemented method of claim 1, further comprising causing a computing device to redact one or more tokens in the digital document in response to determining that one or more classifications indicate that the one or more tokens match one or more items in the lookup list.

10. A system comprising:
one or more non-transitory computer readable media comprising a digital data repository of digital documents; and
processing hardware configured to cause the system to:
determine a probabilistic data structure comprising a bit vector with sets of bit values mapped to a plurality of items in a lookup list, the plurality of items including one or more multi-token items;
determine a maximum number of tokens of the one or more multi-token items in the lookup list;
determine, for a selected token from text content in a digital document, a set of sequential tokens including the selected token based on the maximum number of tokens;
generate classifications for the text content in a digital document of the digital data repository by iteratively:
comparing the set of sequential tokens to the sets of bit values mapped to the plurality of items in the lookup list;
reducing a number of tokens in the set of sequential tokens for a subsequent comparison; and
causing a computing device to modify the digital document or a digital data repository operation of the digital data repository based on the classifications of the text content in the digital document.

11. The system of claim 10, wherein determining the probabilistic data structure comprises generating a Bloom filter by mapping the plurality of items of the lookup list to the sets of bit values in the bit vector.

12. The system of claim 11, wherein the processing hardware is further configured to cause the system to:
detect one or more modifications to the lookup list;
modify the Bloom filter in response to the one or more modifications to the lookup list;
determine an updated maximum number of tokens in response to the one or more modifications to the lookup list; and
modify metadata for the Bloom filter indicating the updated maximum number of tokens.

13. The system of claim 12, wherein the processing hardware is further configured to cause the system to generate classifications for text content in an additional digital document of the digital data repository utilizing the updated maximum number of tokens by determining the updated maximum number of tokens from the metadata of the Bloom filter.

14. The system of claim 10, wherein the processing hardware is further configured to cause the system to:
determine the selected token in the digital document according to an order of tokens of the digital document; and
determine the set of sequential tokens comprising the selected token at a first position in the set of sequential tokens and a total number of tokens equal to the maximum number of tokens.

15. The system of claim 14, wherein the processing hardware is further configured to cause the system to:
reduce the number of tokens in the set of sequential tokens by removing a final token in the set of sequential tokens to generate an updated set of sequential tokens; and
compare the updated set of sequential tokens to the sets of bit values mapped to the plurality of items in the lookup list.

16. The system of claim 10, wherein the processing hardware is further configured to cause the system to cause the computing device to modify the digital document by:
determining that a classification of a set of tokens in the digital document indicates that the set of tokens corresponds to a multi-token item in the lookup list; and
causing the computing device to redact the set of tokens from the digital document.

17. A non-transitory computer readable medium comprising instructions that, when executed by processing hardware, cause the processing hardware to perform operations comprising:
determining a probabilistic data structure comprising a bit vector with sets of bit values mapped to a plurality of items in a lookup list, the plurality of items including one or more multi-token items;
determining a maximum number of tokens of the one or more multi-token items in the lookup list;
determining, for a selected token from text content in a digital document, a set of sequential tokens including the selected token based on the maximum number of tokens;
generating, for the selected token in the digital document, a plurality of classifications for the text content in the digital document by comparing the set of sequential tokens to the sets of bit values of the probabilistic data structure and iteratively reducing a number of tokens in the set of sequential tokens for comparing to the sets of bit values; and
providing, for display within a graphical user interface of a client device, indications of the plurality of classifications of the text content in the digital document relative to the plurality of items in the lookup list.

18. The non-transitory computer readable medium of claim 17, wherein determining the set of sequential tokens comprises:
determining the selected token according to an order of a plurality of tokens in the digital document; and
determining the set of sequential tokens comprising the selected token and one or more additional tokens sequential to the selected token according to the order of the plurality of tokens in the digital document to include a total number of tokens equal to the maximum number of tokens.

19. The non-transitory computer readable medium of claim 18, wherein generating the plurality of classifications comprises:
comparing the set of sequential tokens comprising the selected token in a first position and the one or more additional tokens in the order of the plurality of tokens in the digital document to the sets of bit values of the probabilistic data structure; and
removing a final token in the set of sequential tokens to determine an updated set of sequential tokens for a subsequent comparison to the sets of bit values of the probabilistic data structure.

20. The non-transitory computer readable medium of claim 18, wherein the operations further comprise causing, in response to a selection of an indication of a classification of a set of tokens in the digital document that matches a multi-token item in the lookup list, a computing device to redact the set of tokens in the digital document.

\* \* \* \* \*